(12) United States Patent
Wang et al.

(10) Patent No.: US 12,273,890 B2
(45) Date of Patent: Apr. 8, 2025

(54) METHOD AND APPARATUS FOR UPLINK TRANSMISSION IN A WIRELESS COMMUNICATION SYSTEM

(71) Applicant: Samsung Electronics Co., Ltd., Gyeonggi-do (KR)

(72) Inventors: Yi Wang, Beijing (CN); Feifei Sun, Beijing (CN)

(73) Assignee: Samsung Electronics Co., Ltd (KR)

( * ) Notice: Subject to any disclaimer, the term of this patent is extended or adjusted under 35 U.S.C. 154(b) by 526 days.

(21) Appl. No.: 17/576,312

(22) Filed: Jan. 14, 2022

(65) Prior Publication Data
US 2022/0225387 A1     Jul. 14, 2022

(30) Foreign Application Priority Data

Jan. 14, 2021 (CN) .......................... 202110051042.8

(51) Int. Cl.
*H04W 72/23*     (2023.01)
*H04L 5/00*     (2006.01)
*H04W 72/1268*     (2023.01)

(52) U.S. Cl.
CPC ........... *H04W 72/23* (2023.01); *H04L 5/0053* (2013.01); *H04L 5/0094* (2013.01); *H04W 72/1268* (2013.01)

(58) Field of Classification Search
CPC ......................... H04W 72/23; H04W 72/1268; H04L 5/0053; H04L 5/0094
See application file for complete search history.

(56) References Cited

U.S. PATENT DOCUMENTS

| | | | |
|---|---|---|---|
| 2019/0327743 A1* | 10/2019 | Shi | ........................ H04L 5/0091 |
| 2020/0120701 A1 | 4/2020 | Peng et al. | |
| 2020/0127796 A1 | 4/2020 | Li et al. | |
| 2020/0146037 A1 | 5/2020 | Park et al. | |
| 2020/0154415 A1* | 5/2020 | Oh | ........................ H04L 5/0055 |
| 2020/0162207 A1 | 5/2020 | Hwang et al. | |

(Continued)

FOREIGN PATENT DOCUMENTS

WO     WO-2022156497 A1 *    7/2022    ............... H04L 5/00

OTHER PUBLICATIONS

Machine Translation of WO 2022/156,497 A1, published Jul. 28, 2022. (Year: 2022).*

(Continued)

*Primary Examiner* — Rafael Perez-Gutierrez
*Assistant Examiner* — Gilbert M. Grant
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. This application relates generally to the field of wireless communication technology, and more particularly, to methods and devices for uplink transmission.

16 Claims, 11 Drawing Sheets

(56) References Cited

U.S. PATENT DOCUMENTS

| | | | |
|---|---|---|---|
| 2020/0337077 A1 | 10/2020 | Yoshimura et al. | |
| 2020/0344012 A1 | 10/2020 | Karaki et al. | |
| 2020/0383105 A1* | 12/2020 | Park | H04L 1/1896 |
| 2020/0389271 A1* | 12/2020 | Matsumura | H04L 5/0051 |
| 2020/0413428 A1* | 12/2020 | Liu | H04L 1/1819 |
| 2021/0051727 A1* | 2/2021 | Lei | H04L 1/1812 |
| 2021/0368493 A1* | 11/2021 | Lin | H04L 5/0053 |
| 2022/0052779 A1* | 2/2022 | Ye | H04L 5/0048 |
| 2022/0173878 A1* | 6/2022 | Nory | H04L 5/0098 |
| 2023/0262710 A1* | 8/2023 | Shin | H04L 5/0053 |
| 2023/0300840 A1* | 9/2023 | Zhang | H04L 1/1614 |
| | | | 370/329 |

OTHER PUBLICATIONS

International Search Report dated Apr. 13, 2022 issued in counterpart application No. PCT/KR2022/000698, 6 pages.
European Search Report dated Mar. 28, 2024 issued in counterpart application No. 22739744.5-1213, 8 pages.

\* cited by examiner

METHOD AND APPARATUS FOR UPLINK TRANSMISSION IN A WIRELESS COMMUNICATION SYSTEM

PRIORITY

This application is based on and claims priority under 35 U.S.C. § 119 to Chinese Patent Application No. 202110051042.8, filed on Jan. 14, 2021, in the China National Intellectual Property Administration, the disclosure of which is incorporated by reference herein in its entirety.

BACKGROUND

1. Field

This application relates generally to the field of wireless communication technology, and more particularly, to methods and devices for uplink transmission.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

According to an aspect of the disclosure, a method performed by a terminal in a wireless communication system is provided. The method includes receiving configuration information for a physical uplink control channel (PUCCH), receiving downlink control information (DCI) for scheduling a physical downlink shared channel (PDSCH), receiving downlink data on the PDSCH, based on the DCI, and transmitting feedback information for the PDSCH on the PUCCH, based on the configuration information and the DCI. A set of slot offset values between the PDSCH and the PUCCH is determined according to a subcarrier spacing (SCS) configuration of the PUCCH.

According to an aspect of the disclosure, a method performed by a base station in a wireless communication system is provided. The method includes transmitting configuration information for a PUCCH, transmitting DCI for scheduling a PDSCH, transmitting downlink data on the PDSCH, according to the DCI, and receiving feedback information for the PDSCH on the PUCCH, according to the configuration information and the DCI. A set of slot offset values between the PDSCH and the PUCCH is determined according to an SCS configuration of the PUCCH.

According to an aspect of the disclosure, a terminal in a wireless communication system is provided. The terminal includes a transceiver and a controller. The controller is configured to receive, via the transceiver, configuration information for a PUCCH, receive, via the transceiver, DCI for scheduling a PDSCH, receive, via the transceiver, downlink data on the PDSCH, based on the DCI, and transmit, via the transceiver, feedback information for the PDSCH on the PUCCH, based on the configuration information and the DCI. A set of slot offset values between the PDSCH and the PUCCH is determined according to an SCS configuration of the PUCCH.

According to an aspect of the disclosure, a base station in a wireless communication system is provided. The base station includes a transceiver and a controller. The controller is configured to transmit, via the transceiver, configuration information for a PUCCH, transmit, via the transceiver, DCI for scheduling a PDSCH, transmit, via the transceiver, downlink data on the PDSCH, according to the DCI, and receive, via the transceiver, feedback information for the PDSCH on the PUCCH, according to the configuration information and the DCI. A set of slot offset values between the PDSCH and the PUCCH is determined according to an SCS configuration of the PUCCH.

BRIEF DESCRIPTION OF THE DRAWINGS

The above and other aspects, features, and advantages of certain embodiments of the disclosure will become more apparent from the following description with reference to the accompanying drawings, in which.

DETAILED DESCRIPTION

Figure 1:
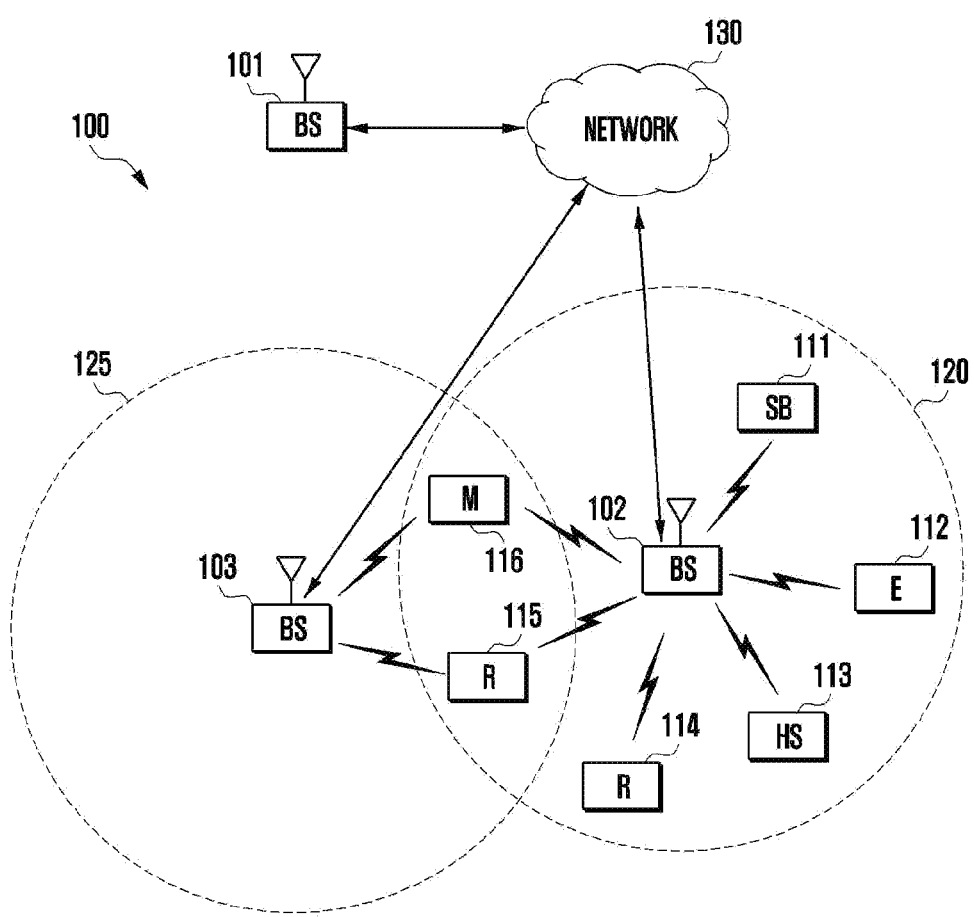
FIG. 1 is a diagram illustrating a wireless network, according to an embodiment.

Embodiments are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the disclosure. The embodiments and the terms used therein are not intended to limit the technology disclosed herein to specific forms, and should be understood to include various modifications, equivalents, and/or alternatives to the corresponding embodiments. A singular expression may include a plural expression unless they are definitely different in context.

FIG. 1 is a diagram illustrating a wireless network, according to an embodiment. The wireless network of FIG. 1 is for illustration purposes only. Other embodiments of the wireless network 100 can be used without departing from the scope of the disclosure.

A wireless network 100 includes a first gNodeB (gNB) 101, a second gNB 102, and a third gNB 103. The first gNB 101 communicates with the second gNB 102 and the third gNB 103. The first gNB 101 also communicates with at least one Internet protocol (IP) network 130, such as, for example, the Internet, a private IP network, or other data networks.

Depending on a type of network, other well-known terms such as "base station" or "access point" can be used instead of "gNodeB" or "gNB". For convenience, the terms "gNodeB" and "gNB" are used to refer to network infrastructure components that provide wireless access for remote terminals. Depending on the type of network, other well-known terms such as "mobile station", "user station", "remote terminal", "wireless terminal", or "user apparatus" can be used instead of "user equipment" or "UE". For convenience, the terms "user equipment" and "UE" are used to refer to remote wireless devices that wirelessly access the gNB, no matter whether the UE is a mobile device (e.g., a mobile phone or a smart phone) or a fixed device (e.g., a desktop computer or a vending machine).

The second gNB 102 provides wireless broadband access to the network 130 for a first plurality of UEs within a coverage area 120 of the second gNB 102. The first plurality of UEs include: a first UE 111, which may be located in a small business (SB); a second UE 112, which may be located in an Enterprise®; a third UE 113, which may be located in a Wifi hotspot a fourth UE 114, which may be located in a first residence (R); a fifth UE 115, which may be located in a second residence (R); and a sixth UE 116, which may be a mobile device (M) (e.g., a cellular phone, a wireless laptop computer, a wireless PDA, etc.). The third gNB 103 provides wireless broadband access to the network 130 for a second plurality of UEs within a coverage area 125 of the third gNB 103. The second plurality of UEs include the fifth UE 115 and the UE 116. One or more of the gNBs 101-103 can communicate with each other and with the UEs 111-116 using 5G, long term evolution (LTE), LTE-A, WiMAX, or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of the first gNB 101, the second gNB 102, and the third gNB 103 include a 2D antenna array. One or more of the first gNB 101, the second gNB 102, and the third gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, the first gNB 101 can directly communicate with any number of UEs and provide wireless broadband access to the network 130 for those UEs. Similarly, each of the second and third gNBs 102-103 can directly communicate with the network 130 and provide direct wireless broadband access to the network 130 for the UEs. In addition, the gNBs 101, 102 and/or 103 can provide access to other or additional external networks, such as, for example, external telephone networks or other types of data networks.

Figure 2A:
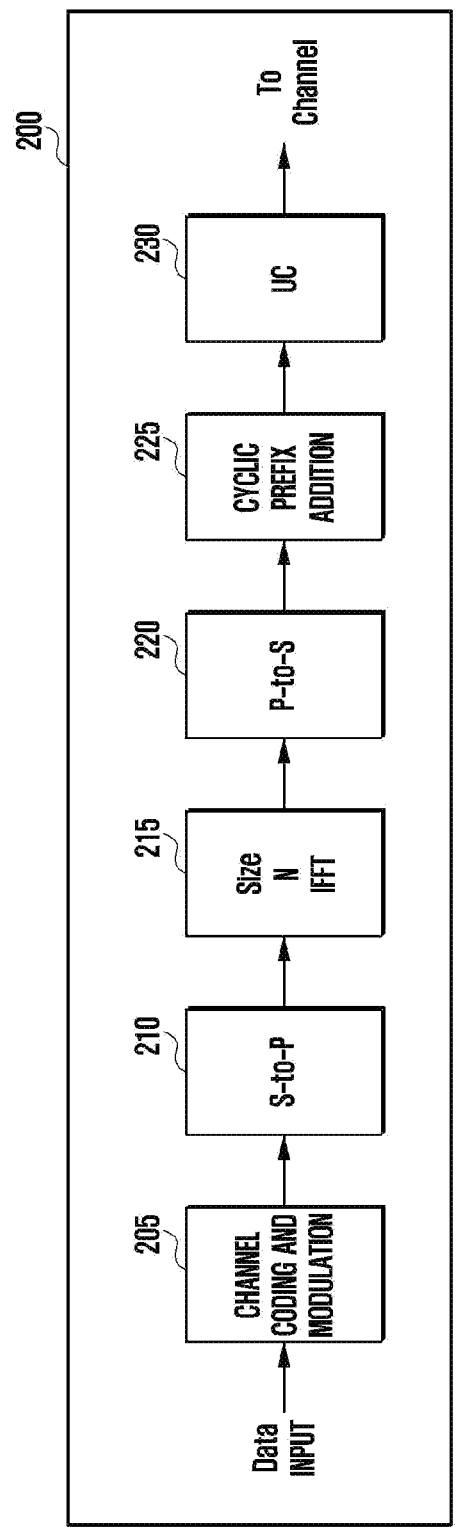
FIGS. 2A and 2B are diagrams illustrating a wireless transmission path and a wireless reception path, according to an embodiment.
Figure 2B:
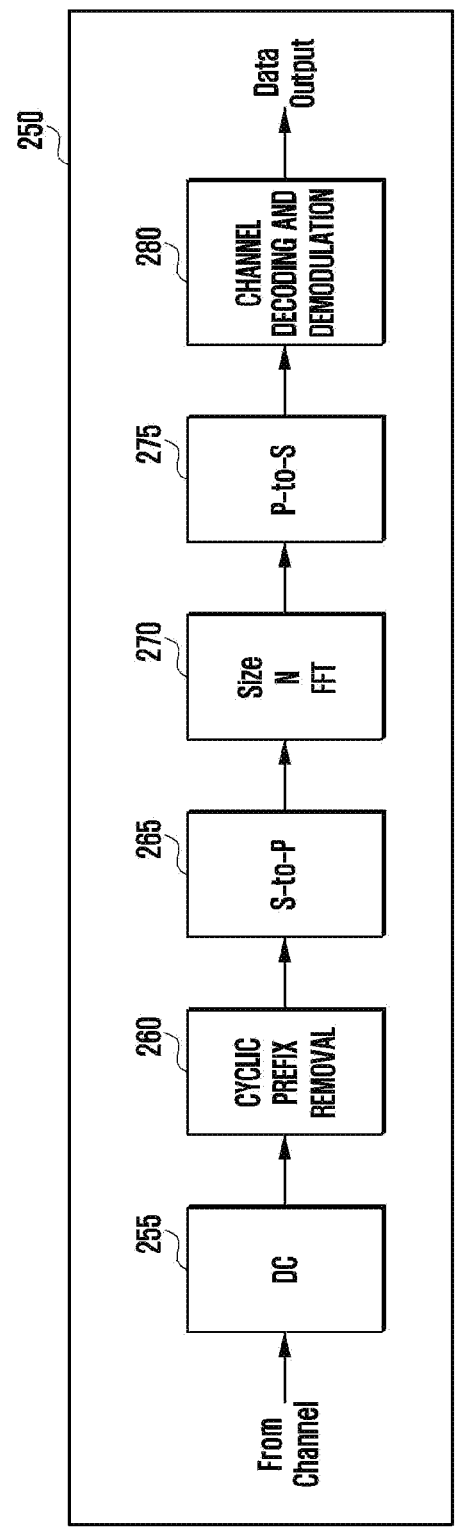

FIGS. 2A and 2B are diagrams illustrating wireless transmission and reception paths, according to an embodiment. Herein, a transmission path 200 can be described as being implemented in a gNB, such as, for example, the second gNB 102, and a reception path 250 can be described as being implemented in a UE, such as, for example, the sixth UE 116. However, it should be understood that the reception path 250 can be implemented in any gNB and the transmission path 200 can be implemented in any UE. The reception path 250 may be configured to support codebook designs and structures for systems with 2D antenna arrays as described herein.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, a serial-to-parallel (S-to-P) block 265, a size N fast Fourier transform (FFT) block 270, a parallel-to-serial (P-to-S) block 275, and a channel decoding and demodulation block 280.

In the transmission path 200, the channel coding and modulation block 205 receives a set of information bits, applies coding (e.g., low density parity check (LDPC) coding), and modulates the input bits (e.g., using quadrature phase shift keying (QPSK) or quadrature amplitude modulation (QAM)) to generate a sequence of frequency-domain modulated symbols. The serial-to-parallel (S-to-P) block 210 converts (e.g., demultiplexes) serial modulated symbols into parallel data to generate N parallel symbol streams, where N is a size of the IFFT/FFT used in the second gNB 102 and the sixth UE 116. The size N IFFT block 215 performs IFFT operations on the N parallel symbol streams to generate a time-domain output signal. The parallel-to-serial block 220 converts (e.g., multiplexes) parallel time-domain output symbols from the Size N IFFT block 215 to generate a serial time-domain signal. The cyclic prefix addition block 225 inserts a cyclic prefix into the time-domain signal. The up-converter 230 modulates (e.g., up-converts) the output of the cyclic prefix addition block 225 to an RF frequency for transmission via a wireless channel. The signal can also be filtered at a baseband before switching to the RF frequency.

The RF signal transmitted from the second gNB 102 arrives at the sixth UE 116 after passing through the wireless channel, and operations in reverse to those at the second gNB 102 are performed at the sixth UE 116. The down-converter 255 down-converts the received signal to a baseband frequency, and the cyclic prefix removal block 260 removes the cyclic prefix to generate a serial time-domain baseband signal. The serial-to-parallel block 265 converts the time-domain baseband signal into a parallel time-domain signal. The size N FFT block 270 performs an FFT algorithm to generate N parallel frequency-domain signals. The parallel-to-serial block 275 converts the parallel frequency-domain signal into a sequence of modulated data symbols. The channel decoding and demodulation block 280 demodulates and decodes the modulated symbols to recover the original input data stream.

Each of the gNBs 101-103 may implement the transmission path 200 similar to that for transmitting to the UEs 111-116 in the downlink, and may implement the reception path 250 similar to that for receiving from the UEs 111-116 in the uplink. Similarly, each of the UEs 111-116 may implement the transmission path 200 for transmitting to the gNBs 101-103 in the uplink, and may implement the reception path 250 for receiving from gNBs 101-103 in the downlink.

Each of the components in FIGS. 2A and 2B can be implemented using only hardware, or using a combination of hardware and software/firmware. For example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as, for example, discrete Fourier transform (DFT) and inverse discrete Fourier transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
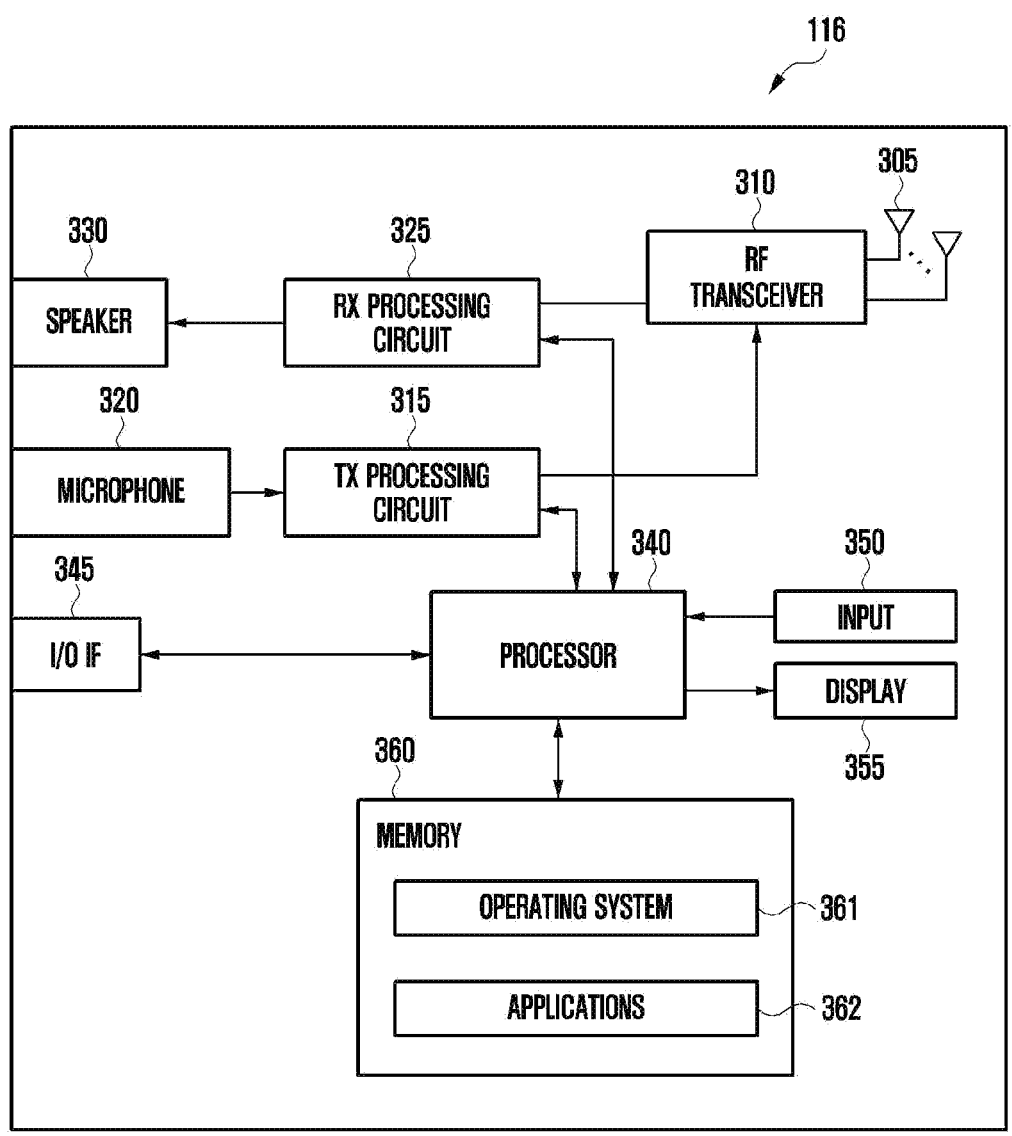
FIG. 3A is a diagram illustrating a UE, according to an embodiment.

FIG. 3A is a diagram illustrating a UE, according to an embodiment. The UE shown in FIG. 3A is for illustrative purposes only, and any UE of FIG. 1 can have the same or a similar configuration. However, a UE has various configurations, and FIG. 3A does not limit the scope of the disclosure to any specific implementation of the UE.

The sixth UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to the speaker 330 (e.g., for voice data) or to the processor/controller 340 for further processing (e.g., for web browsing data).

The TX processing circuit 315 receives analog or digital voice data from microphone 320 or other outgoing baseband data (e.g., network data, email, or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna. 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325, and the TX processing circuit 315, according to well-known principles. The processor/controller 340 may include at least one microprocessor or microcontroller.

The processor/controller 340 is also capable of executing other processes and programs residing in the memory 360, such as, for example, operations for channel quality measurement and reporting for systems with 2D antenna arrays, as described herein. The processor/controller 340 can move data into or out of the memory 360 as required by an execution process. The processor/controller 340 may be configured to execute the application 362 based on the OS 361 or in response to signals received from the gNB or the operator. The processor/controller 340 is also coupled to an I/O interface 345, where the I/O interface 345 provides UE 116 with the ability to connect to other devices such as, for example, laptop computers and handheld computers. I/O interface 345 is a communication path between these accessories and the processor/controller 340.

The processor/controller 340 is also coupled to the input device(s) 350 and the display 355. An operator of the sixth UE 116 can input data into the sixth UE 116 using the input device(s) 350. The display 355 may be a liquid crystal display or other display capable of presenting text and/or at least limited graphics (e.g., from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of the sixth UE 116, various changes can be made to FIG. 3A. For example, various components in FIG. 3A can be combined, further subdivided, or omitted, and additional components can be added according to specific requirements. As a specific example, the processor/controller 340 can be divided into a plurality of processors, such as, one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
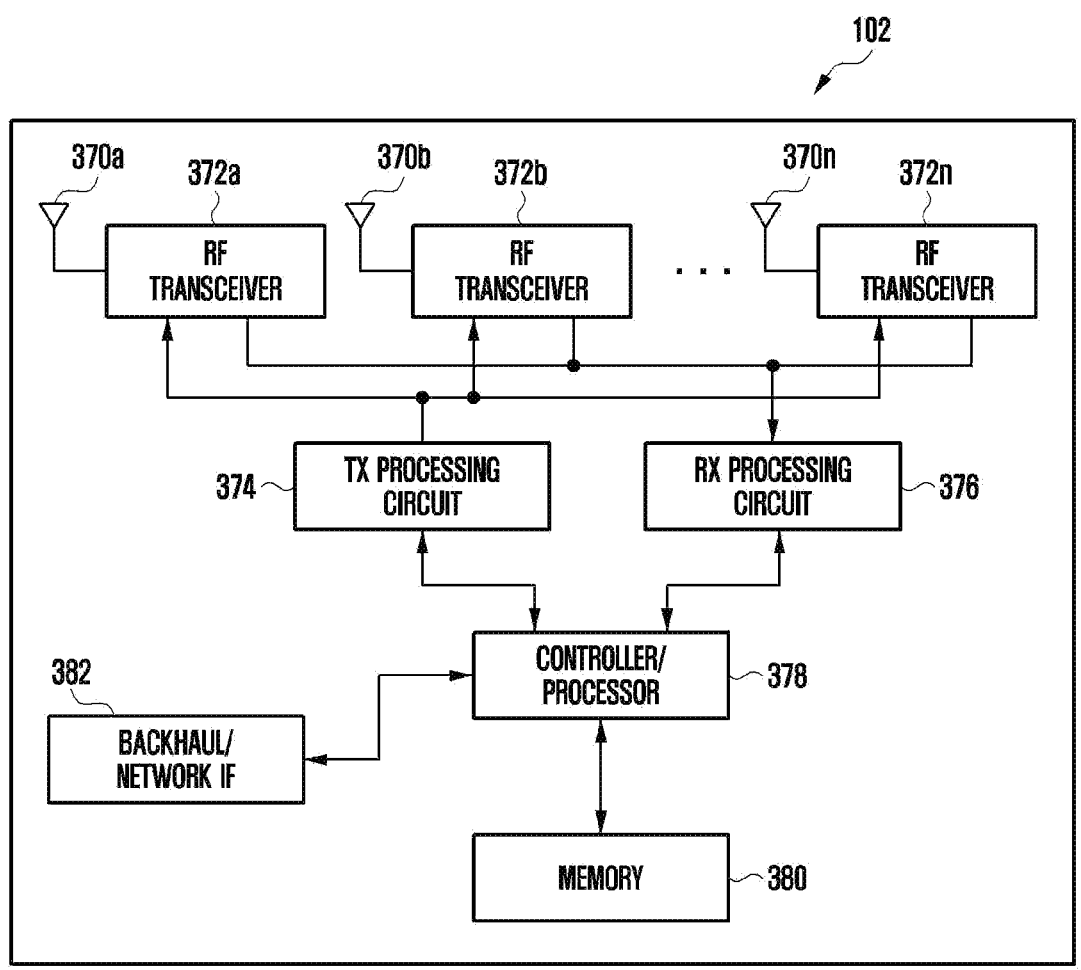
FIG. 3B is a diagram illustrating a base station, according to an embodiment.

FIG. 3B is a diagram illustrating a gNB, according to an embodiment. The second gNB 102 shown in FIG. 3B is for illustrative purposes only, and other gNBs of FIG. 1 can have the same or similar configuration. However, a gNB has various configurations, and FIG. 3B does not limit the scope of the disclosure to any specific implementation of a gNB. It should be noted that the first gNB 101 and the third gNB 103 can include the same or similar structures as the second gNB 102.

As shown in FIG. 3B, the second gNB 102 includes a plurality of antennas 370a-370n, a plurality of RF transceivers 372a-372n, a transmission (TX) processing circuit 374, and a reception (RX) processing circuit 376. One or more of the plurality of antennas 370a-370n may include a 2D antenna array. The second gNB 102 also includes a controller/processor 378, a memory 380, and a backhaul or network interface 382.

The RF transceivers 372a-372n receive an incoming RF signal from the antennas 370a-370n, such as, for example, a signal transmitted by UEs or other gNBs. The RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. The RX processing circuit 376 transmits the processed baseband signal to the controller/processor 378 for further processing.

The TX processing circuit 374 receives analog or digital data (e.g., voice data, network data, email, or interactive video game data) from the controller/processor 378. The TX processing circuit 374 encodes, multiplexes, and/or digitizes outgoing baseband data to generate a processed baseband or IF signal. The RF transceivers 372a-372n receive the outgoing processed baseband or IF signal from the TX processing circuit 374, and up-convert the baseband or IF signal into an RF signal transmitted via the antennas 370a-370n.

The controller/processor 378 can include one or more processors or other processing devices that control the overall operation of the second gNB 102. For example, the controller/processor 378 can control the reception of of forward channel signals and the transmission of backward channel signals through the RF transceivers 372a-372n, the RX processing circuit 376, and the TX processing circuit 374 according to well-known principles. The controller/processor 378 can also support additional functions, such as, for example, higher-level wireless communication functions. For example, the controller/processor 378 can perform a blind interference sensing (BIS) process, such as that performed through a BIS algorithm, and decode a received signal from which an interference signal is subtracted. The controller/processor 378 may support any of a variety of other functions in the second gNB 102. The controller/processor 378 may include at least one microprocessor or microcontroller.

The controller/processor 378 is also capable of executing programs and other processes residing in the memory 380, such as, for example, a basic OS. The controller/processor 378 can also support channel quality measurement and reporting for systems with 2D antenna arrays, as described herein. The controller/processor 378 supports communication between entities, such as web RTCs. The controller/processor 378 can move data into or out of the memory 380 as required by an execution process.

The controller/processor 378 is also coupled to the backhaul or network interface 382. The backhaul or network interface 382 allows the gNB 102 to communicate with other devices or systems through a backhaul connection or through a network. The backhaul or network interface 382 can support communication over any suitable wired or wireless connection(s). For example, when the gNB 102 is implemented as a part of a cellular communication system, such as, for example, a cellular communication system supporting 5G or new radio access technology or NR, UE or LTE-A, the backhaul or network interface 382 can allow the second gNB 102 to communicate with other gNBs through wired or wireless backhaul connections. When the second gNB 102 is implemented as an access point, the backhaul or network interface 382 can allow the second gNB 102 to communicate with a larger network, such as, for example, the Internet, through a wired or wireless local area network or through a wired or wireless connection. The backhaul or network interface 382 includes any suitable structure that supports communication through a wired or wireless connection, such as, for example, an Ethernet or an RF transceiver.

The memory 380 is coupled to the controller/processor 378. A part of the memory 380 can include a RAM, while another part of the memory 380 can include a flash memory or other ROMs. A plurality of instructions, such as the BIS algorithm, may be stored in the memory. The plurality of instructions are configured to cause the controller/processor 378 to execute the BIS process and decode the received signal after subtracting at least one interference signal determined by the BIS algorithm.

As described in greater detail below, the transmission and reception paths of the second gNB 102 (implemented using RF transceivers 372a-372n, TX processing circuit 374 and/or RX processing circuit 376) support aggregated communication with FDD cells and TDD cells.

Although FIG. 3B illustrates an example of the second gNB 102, various changes may be made to FIG. 3B. For example, the second gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, the second gNB 102 can include multiple instances of the TX processing circuit 374 and/or the RX processing circuit 376.

In a wireless communication system, it takes a period of processing time for a terminal to transmit an uplink signal or receive a signal. For example, the minimum time required for the UE to receive a physical downlink control channel (PDCCH) or a physical downlink shared channel (PDSCH) and perform operations such as decoding is usually referred to as the minimum processing delay for PDCCH or PDSCH reception. The minimum time required for the UE to transmit a physical uplink shared channel (PUSCH) or a PUCCH and perform operations such as encoding is usually referred to as the minimum processing delay for PUSCH or PUCCH transmission preparation. These minimum processing delays are related to the structure of the channel, subcarrier spacing, and UE capabilities for processing. In addition, if the beam used to transmit or receive the signal changes, or the operating frequency point changes, the processing time required will also change.

In order to determine the time resources of the PDSCH, or PUSCH, or PUCCH, the UE needs to determine the slot/sub-slot in which these physical channels are located, and the symbol index in the slot/sub-slot. Among them, the slot/sub-slot where the PDSCH is located is determined according to K0, which is also called the slot/sub-slot offset from PDCCH to PDSCH; the slot/sub-slot where the PUSCH is located is determined according to K2, which is also called the slot/sub-slot from PDCCH to PUSCH; the slot/sub-slot where PUCCH is located is determined according to K1, which is also called the time delay from PDSCH to HARQ feedback.

Generally, the more reasonable K0 and/or K1 and/or K2 corresponding to different subcarrier spacing (SCS) are different, because it needs to consider minimum processing delays for UE to process the corresponding physical channel with respect to the values of K0 and/or K1 and/or K2. These minimum processing delays change with subcarrier spacing. The processing delay includes at least one of PDCCH processing delay, PDSCH processing delay, PUSCH processing delay, and PUCCH processing delay. The K1 and K2 indicated by the base station cannot be less than the corresponding minimum processing delay. If the K0 indicated by the base station is less than the PDSCH processing delay, the UE needs to buffer the signal within a certain period of time to be processed after the PDCCH is demodulated. In order to flexibly support multiple subcarrier spacings, the time offset can be determined based on the subcarrier spacing.

Figure 4:
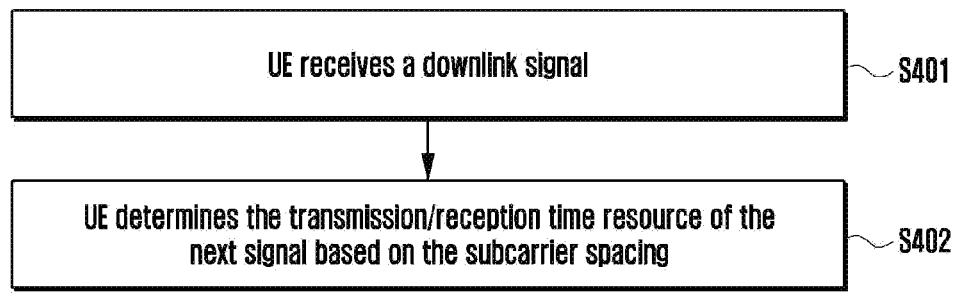
FIG. 4 is a flowchart illustrating a method for signal transmission performed by a UE, according to an embodiment.

FIG. 4 is a flowchart illustrating a signal transmission method performed by a UE, according to an embodiment.

At S401, the UE receives a downlink signal.

At S402, the UE determines the transmission/reception time resource of the next signal based on the subcarrier spacing. The time resource is determined based on the slot where the downlink signal is located and the time offset related to the subcarrier spacing.

Hereinafter, the method of FIG. 4 is described assuming that the downlink signal received at S401 is a PDSCH, and the next signal at S402 is a PUCCH transmission. However, it should be understood that the method proposed herein is not limited to this. This method is also applicable to the scenarios in which the downlink signal received at S401 is a PDCCH and the next signal at S402 is a PDSCH reception, or the downlink signal received at S401 is a PDCCH and the next signal at S402 is a PUSCH transmission.

The time offset corresponding to the subcarrier spacing is determined based on the basic time offset and an offset related to the subcarrier spacing. The time offset of the subcarrier spacing may be one set of basic time offsets K0 and/or K1 and/or K2 applicable to all subcarrier spacings pre-defined by standards and/or configured by the base station, and offsets related to one or one group of subcarrier spacing pre-defined by standards and/or configured by the base station. Taking K1 as an example, the set of basic time offset K1 pre-defined by the standards is K={1,2,3,4,5,6,7,8}, which is applicable to all subcarrier spacings, and one K1 from the set is indicated to the UE by the base station. A set of Δ is pre-defined by the standards, where each value ($\Delta\mu_{PUCCH}$) is determined according to the PUCCH subcarrier spacing ($\mu_{PUCCH}$). If the PDSCH is located in slot n, the slot of PUCCH where the HARQ-ACK of the PDSCH is located is n+K1+$\Delta\mu_{PUCCH}$. Table 1 gives one example of $\Delta\mu_{PUCCH}$. For another example, the PUSCH time resource allocation table is pre-defined by the standards, which includes the parameter K2 for indicating the slot of the PUSCH, parameters S and L for indicating the start symbol and the time length of the PUSCH, where the value of K2 includes the basic time offset applicable to all subcarrier spacing and the offset related to the subcarrier spacing. The UE determines K2 according to the subcarrier spacing of PUSCH.

TABLE 1

| μPUCCH | Δ |
| --- | --- |
| 0, 1, 2, 3 (SCS = 15, 30, 60, 120 KHz) | 0 |
| 4 (SCS = 240 KHz) | 1 |
| 5 (SCS = 480 KHz) | 2 |
| 6 (SCS = 960 KHz) | 3 |

Preferably, the offset is only applicable to a specific downlink control information (DCI) format. For example, the specific DCI format includes the fallback DCI format. The offset of K1 is only applicable to the fallback DCI format, and is applicable to the PUCCH corresponding to the PDSCH scheduled by DCI 1_0. The K1 of the normal DCI format is determined according to the set of K1 configured by the base station.

The offset may only be applicable before the radio resource control (RRC) connection is established.

The offset may only be applicable to a specific channel. For example, the configured offset of K1 only applies to PUCCH of MsgB or Msg 4.

The offset may only be applicable to a specific PDCCH search space and/or radio network temporary identifier (RNTI). For example, the offset of K2 is only applicable to the PUSCH scheduled in the search space (SS) of CORE-SET 0. For example, the offset of K0 is applicable to the PDSCH scheduled in SS of Type 0 and scheduled by the PDCCH scrambled with system information-RNTI (SI-RNTI).

The offset may only be applicable to time information configured by a specific high-level signaling. For example, the offset is only applicable to the pusch-TimeDomainAllocationList configured in the system information. For example, the offset is only applicable to pusch-TimeDomainAllocationList configured in pusch-ConfigCommon. It is not applicable to punch-TimeDomainAllocationList configured in pusch-Config. For example, the offset is only applicable to the pdsch-TimeDomainAllocationList configured in the system information. For example, the offset is only applicable to the pdsch-TimeDomainAllocationList configured in pdsch-ConfigCommon. It is not applicable to pdsch-TimeDomainAllocationList configured in pdsch-Config.

The time offset corresponding to the subcarrier spacing may be pre-defined (for example, pre-defined by standards) and/or configured by the base station. According to the subcarrier spacing, the set of K0 and/or the set of K1 and/or the set of K2 are pre-defined by the standards and/or configured by the base station, respectively. Taking K1 as an example, for example, two sets of K1 $K_{1,1}=\{1,2,3,4,5,6\}$, $K_{1,2}=\{3,4,5,6,7,8,9,10\}$, are pre-defined by the standard. The set of K1 is $K_{1,1}$, if the subcarrier spacing of PUCCH $\mu_{PUCCH}<4$, and the set of K1 is $K_{1,2}$, if the set of $\mu_{PUCCH}\geq4$.

If the subcarrier spacing of the downlink signal in step 1 is different from that of the next signal in step 2, the time offset corresponding to the subcarrier spacing may be determined according to the largest subcarrier spacing; or the time offset corresponding to the subcarrier spacing may be determined according to the maximum value of the time length for the time offsets corresponding to the different subcarrier spacings.

If the downlink signal in step 1 is PDSCH, the next signal in step 2 is PUCCH, and the PDSCH is a PDSCH scheduled based on PDCCH, the time offset corresponding to the subcarrier spacing may be determined according to the maximum subcarrier spacing among subcarrier spacings of PDCCH, PDSCH, and PUCCH; or the time offset corresponding to the subcarrier spacing may be determined according to the maximum value of the time length for the time offsets corresponding to the different subcarrier spacings.

As described above, it is possible to indicate appropriate time resource information under the scenarios of various subcarrier spacings, to ensure scheduling flexibility of each user and to save signaling overhead.

In a communication system, such as a beamforming-based system, if the transmission node or reception node needs to use different beams to transmit or receive signals on different resources, it usually takes a period of time to switch the beams, denoted as $T_{beam\_switch}$. In some cases, the length of $T_{beam\_switch}$ is not negligible relative to one orthogonal frequency-division multiplexing (OFDM) symbol. For example, the time length for one OFDM symbol with a subcarrier spacing of 960 KHz is about 1.1 microseconds and a $T_{beam\_switch}$ is about 3 microseconds, and the transmission node or reception node needs a time length of about 3 OFDM symbols to perform beam switching. If the transmission of one signal is based on beam 1 and the end symbol index of the signal is i, while the transmission of another signal is based on beam 2 and the start symbol index of the signal is j, then the number of symbol corresponding to $j-i \geq T_{beam\_switch}$ is needed. If the interval between the signals of the two different beams is less than $T_{beam\_switch}$, the transmission node or reception node may not have time to switch, which may affect the transmission or reception of at least one of the signals.

Figure 5:
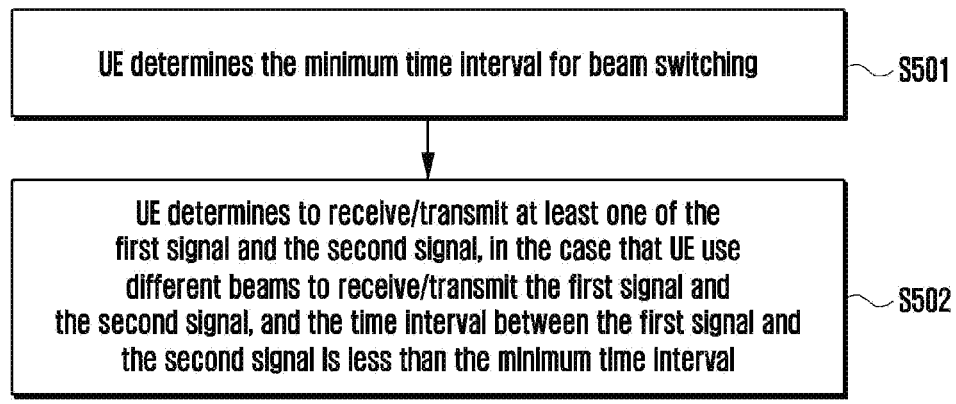
FIG. 5 is a flowchart illustrating a method performed by a UE in a beamforming-based system, according to an embodiment.

FIG. 5 is a flowchart illustrating a method performed by a UE in a communication system, according to an embodiment. At S501, the UE determines the minimum time interval for beam switching. At S502, if the beam characteristics associated with the first signal and the second signal are different, and the time interval between the first signal and the second signal is less than the minimum time interval, the UE determines to receive/transmit at least one of the first signal and the second signal.

A minimum time interval Ngap can be pre-defined by standards or configured by the base station. When the time interval between the first signal and the second signal is less than Ngap, it is necessary to receive or transmit at least one of the signals according to certain rules. The first signal and the second signal are based on different beams. The minimum time interval Ngap is related to SCS. Preferably, the different beams are embodied as different quasi co-location (QCL)-TypeD characteristics. If the QCL-Type characteristics are the same, it means that the same spatial domain reception parameters (spatial Rx parameters) can be used. QCL information can be indicated by a transmission configuration indicator (TCI).

At S502, the UE determines to receive/transmit one of the first signal and the second signal, and the one signal is determined based on one or more of the following rules:

If the first signal and the second signal are both downlink control signals:
If a search space of one control signal is the common search space (CSS), then the control signal is determined to be the one signal;
If search spaces of the two control signals are both CSS, then the control signal with the smallest CSS index value is determined as the one signal;
If search spaces of the two control signals are both UE-specific search space (USS), then the control signal with the smallest USS index value is determined to be the one signal;
If the first signal and the second signal are both uplink control signals, then the one signal is determined based on priority and/or whether the uplink control signal is based on scheduling:
A signal with a high priority is determined to be the one signal;
In the case that priorities are the same, if the first signal is an uplink control signal based on scheduling and the second signal is an uplink control signal based on configuration, then the first signal based on scheduling is determined to be the one signal;
If the first signal is an uplink control signal based on scheduling and the second signal is an uplink control signal based on configuration, the first signal based on scheduling is determined to be the one signal;
If the first signal and the second signal are a downlink control signal and a data signal/reference signal, respectively, then the one signal is a downlink control signal;
If the first signal and the second signal are an uplink control signal and an uplink data signal, respectively:
The uplink control signal is determined to be the one signal; or
A signal with a high priority is determined to be the one signal;
In the case that priorities are the same, the uplink control signal is determined to be the one signal; or
In the case that priorities are the same, the signal based on scheduling is determined to be the one signal;
If the first signal and the second signal are both data signals, then the one signal is determined based on priority and/or whether the data signal is based on scheduling:
A data signal with a high priority is determined to be the one signal;

In the case that priorities are the same, the data signal based on scheduling is determined to be the one signal;

The data signal based on scheduling is determined to be the one signal;

The data signal with earlier reception/transmission time is determined to be the one signal;

If the first signal and the second signal are physical random access channel (PRACH) signal and other uplink signals, respectively:

The PRACH signal is determined to be the one signal;

If the first signal is the PRACH signal of the primary cell (Pcell), then the first signal is determined to be the one signal;

If the first signal is the PRACH signal of the secondary cell (Scell), then the second signal is determined to be the one signal.

At S502, determining to transmit at least one of the first signal and the second signal by the UE includes that the UE determines to receive/transmit both the first signal and the second signal, and the method further includes that the UE determines the beam for receiving/transmitting both the first signal and the second signal based on one or more of the following rules:

If the first signal and the second signal are both downlink control signals:

If a search space of one control signal is the common search space (CSS), the beam of the control signal is determined to be the beam;

If search spaces of the two control signals are both CSS, then the beam of the control signal with the smallest CSS index value is determined to be the beam;

If search spaces of the two control signals are both UE-specific search space (USS), then the beam of the control signal with the smallest USS index value is determined to be the beam;

If the first signal and the second signal are both uplink control signals, then the beam is determined based on priority and/or whether the uplink control signal is based on scheduling:

The beam of a signal with a high priority is determined to be the beam;

In the case that priorities are the same, if the first signal is an uplink control signal based on scheduling and the second signal is an uplink control signal based on configuration, then the first signal based on scheduling is determined to be the beam;

If the first signal is an uplink control signal based on scheduling and the second signal is an uplink control signal based on configuration, the first signal based on scheduling is determined to be the beam;

If the first signal and the second signal are a downlink control signal and a data signal/reference signal, respectively, then the beam of the downlink control signal is determined to be the beam;

If the first signal and the second signal are an uplink control signal and an uplink data signal, respectively:

The beam of the uplink control signal is determined to be the beam; or

The beam of the signal with a high priority is determined to be the beam;

In the case that priorities are the same, the beam of the uplink control signal is determined to be the beam; or In the case that priorities are the same, the beam of the signal based on scheduling is determined to be the beam;

If the first signal and the second signal are both data signals, then the beam is determined based on priority and/or whether the data signal is based on scheduling:

The beam of the data signal with a high priority is determined to be the beam;

In the case that priorities are the same, the beam of the data signal based on scheduling is determined to be the beam;

The beam of the data signal based on scheduling is determined to be the beam;

The beam of the data signal with the earlier reception/transmission time is determined to be the beam;

If the first signal and the second signal are the PRACH signal and other uplink signals:

The beam of the PRACH signal is determined to be the beam;

If the first signal is the PRACH signal of the Pcell, then the beam of the first signal is determined to be the beam;

If the first signal is the PRACH signal of the secondary cell (Scell), then the beam of the second signal is determined to be the beam.

The scenarios, in which transmitting/receiving signals are determined according to the above rules, are shown below:

(1) If the first signal and the second signal are both PDCCHs, and the time interval between the end position of the search space where the PDCCH of the first signal is located and the start position of the search space where the PDCCH of the second signal is located is less than Ngap, the UE only receives one of the signals. The received signal satisfies at least one of the following conditions:

(1.1) If at least one of the search spaces of the two signals is a common search space (CSS), the received signal satisfies that the search space of the signal is CSS. And if there are multiple CSSs, the received signal satisfies that the CSS of the signal is of smallest CSS index value.

(1.2) lithe search spaces of the two signals are both the user-specific search space (USS), the received signal satisfies that the search space of the signal is USS and the USS index value of the signal is the smallest.

(1.3) If at least one of the search spaces of the two signals is a type1 CSS, the received signal is a signal in the type1 CSS.

(2) If the first signal is PDSCH, the second signal is PDSCH, and the time interval between the end position of the search space where the PDCCH of the first signal is located and the start position of the PDSCH of the second signal is located is less than Ngap, or the time interval between the end position of the PDSCH of the second signal and the start position of the search space where the PDCCH of the first signal is located is less than Ngap, then the UE only receives the first signal PDCCH.

(3) If the first signal is PDCCH, the second signal is CSI-RS, and the time interval between the end position of the search space where the PDCCH of the first signal is located and the start position of the CSI-RS of the second signal is located is less than Ngap, or the time interval between the end position of the CSI-RS of the second signal and the start position of the search space where the PDCCH of the first signal is located is less than Ngap, then the UE only receives the first signal PDCCH.

(4) If the first signal is PDCCH, the second signal is CSI-RS, and the time interval between the end position of the search space where the PDCCH of the first signal is located and the start position of the CSI-RS of the second signal is located is less than Ngap, or the time interval between the end position of the CSI-RS of the second signal and the start position of the search space where the PDCCH of the first signal is located is less than Ngap, then the UE receives the PDCCH and the CSI-RS according to the beam direction for PDCCH reception.

(5) If the first signal is PDSCH, the second signal is CSI-RS, and the time interval between the end position of the PDSCH of the first signal and the start position of the CSI-RS of the second signal is less than Ngap, or the time interval between the end position of the CSI-RS of the second signal and the start position of the PDSCH of the first signal is less than Ngap, then the UE only receives one of the signals. If the CSI-RS is an aperiodic CSI-RS triggered based on the PDCCH and the PDSCH is an SPS PDSCH, then the UE only receives the CSI-RS, otherwise, the UE receives the PDSCH.

(6) If the first signal is PDSCH, the second signal is CSI-RS, and the time interval between the end position of the PDSCH of the first signal and the start position of the CSI-RS of the second signal is less than Ngap, or the time interval between the end position of the CSI-RS of the second signal and the start position of the PDSCH of the first signal is less than Ngap, then the UE receives these two signals according to the beam direction of one of the signals. If the CSI-RS is an aperiodic CSI-RS triggered based on the PDCCH and the PDSCH is an SPS PDSCH, then the UE receives these two signals based on the beam for CSI-RS reception; otherwise, the UE receives these two signals based on the beam for PDSCH reception.

(7) If the first signal is PDSCH1, the second signal is PDSCH2, and the time interval between the end position of PDSCH1 and the start position of PDSCH2 is less than Ngap, or the time interval between the end position of PDSCH2 and the start position of PDSCH1 is less than Ngap, then the UE only receives one of the signals. The received signal can be determined according to at least one of the following methods:
  (7.1) If the priorities of PDSCH1 and PDSCH2 are different, the received signal is a signal with a higher priority. The priority may be determined according to the priority configured or indicated by the base station.
  (7.2) If the priority of PDSCH1 and PDSCH2 are the same: PDSCH1 is scheduled based on PDCCH and PDSCH2 is an SPS PDSCH, then the UE only receives PDSCH1, otherwise, the UE receives the earlier PDSCH in time.
  (7.3) If PDSCH1 is scheduled based on PDCCH and PDSCH2 is SPS PDSCH, the only receives PDSCH1, otherwise, the UE, receives the one PDSCH earlier in time.

(8) If the first signal is PDSCH1, the second signal is PDSCH2, and the time interval between the end position of PDSCH1 and the start position of PDSCH2 is less than Ngap, or the time interval between the end position of PDSCH2 and the start position of PDSCH1 is less than Ngap, then the UE receives these two signals according to the beam direction of one of the signals. The rules for determining the beam direction can refer to the rules in (7).

(9) If the first signal is PDSCH1, the second signal is PDSCH2, and the time interval between the end position of PDSCH1 and the start position of PDSCH2 is less than Ngap, or the time interval between the end position of PDSCH2 and the start position of PDSCH1 is less than Ngap, then the UE only transmits one of the signals. The transmitted signal can be determined according to at least one of the following methods:
  (9.1) If the priorities of PUSCH1 and PUSCH2 are different, the transmitted signal is a signal with a higher priority. The priority may be determined according to the priority configured or indicated by the base station.
  (9.2) If the priority of PUSCH1 and PUSCH2 are the same: If PUSCH1 is scheduled based on PDCCH and PUSCH2 is a CG PUSCH, then the UE only transmits PUSCH1; otherwise, the UE transmits the earlier PUSCH in time.
  (9.3) If PUSCH1 is scheduled based on PDCCH and PUSCH2 is a CG PUSCH, the UE only transmits PUSCH1, otherwise, the UE transmits the one PUSCH earlier in time.

(10) If the first signal is PUSCH1, the second signal is PUSCH2, and the time interval between the end position of PUSCH1 and the start position of PUSCH2 is less than Ngap, or the time interval between the end position of PUSCH2 and the start position of PUSCH1 is less than Ngap, then the UE transmits these two signals according to the beam direction of one of the signals. The rules for determining the beam direction can refer to the rules in (9).

(11) If the first signal is PUCCH1, the second signal is PUCCH2, and the time interval between the end position of PUCCH1 and the start position of PUCCH2 is less than Ngap, or the time interval between the end position of PUCCH2 and the start position of PUCCH1 is less than Ngap, then the UE only transmits one of the signals. The transmitted signal can be determined according to at least one of the following methods:
  (11.1) If the priorities of PUCCH1 and PUCCH2 are different, the transmitted signal is a signal with a higher priority.
    The priority may be determined according to the priority configured or indicated by the base station. The priority may be determined according to the type of uplink control information, for example, HARQ-ACK≥SR>CSI. The priority may be determined according to the priority and the type of uplink control information configured or indicated by the base station.
  (11.2) If the priority of PUCCH1 and PUCCH2 are the same: If PUCCH1 is scheduled based on PDCCH and PUCCH2 is a PUCCH configured by a higher layer, then the UE only transmits PUCCH1; otherwise, the UE transmits the PUCCH earlier in time
  (11.3) If PUCCH1 is scheduled based on PDCCH and PUCCH2 is configured by higher layers, then the UE only transmits PUCCH1; otherwise, the UE transmits the PUCCH earlier in time.

(12) If the first signal is PUCCH1 and the second signal is PUCCH2, and the time interval between the end position of PUCCH1 and the start position of PUCCH2 is less than Ngap, or the time interval between the end position of PUCCH2 and the start position of PUCCH1 is less than Ngap, then the UE transmits these two signals according to the beam direction of one of the signals. The rules for determining the beam direction can refer to the rules in (11).

(13) If the first signal is PUCCH, second signal is PUSCH, and the time interval between the end position of PUCCH and the start position of PUSCH is less than Ngap, or the time interval between the end position of PUSCH and the start position of PUCCH is less than Ngap, then the UE only transmits one of the signals. The transmitted signal can be determined according to at least one of the following methods:

(13.1) If the priorities of PUCCH and PUSCH are different, the transmitted signal is a signal with a higher priority.
  (13.2) If the priorities of PUCCH and PUSCH are the same, then PUCCH is transmitted.
  (13.3) If the priorities of PUCCH and PUSCH are the same:
    If the PUSCH is scheduled based on the PUCCH and the PUCCH is a PUCCH configured by a higher layer, then the UE only transmits the PUSCH; otherwise, the UE transmits the PUCCH.
  (13.4) Transmits PUCCH.
  (13.5) If the PUSCH is scheduled based on the PDCCH and the PUCCH is a PUCCH configured by a higher layer, then the UE only transmits the PUSCH; otherwise, the UE transmits the PUCCH.

(14) If the first signal is PUCCH, the second signal is PUSCH, and the time interval between the end position of the PUCCH and the start position of the PUSCH is less than Ngap, or the time interval between the end position of the PUSCH and the start position of the PUCCH is less than Ngap, then the UE transmits these two signals according to the beam direction of one of the signals. The rules for determining the beam direction can refer to the rules in (13).

(15) If the first signal is PRACH of the Pcell, the second signal is PUCCH, PUSCH or sounding reference signal (SRS), and the time interval between the end position of the PRACH and the start position of the second signal is less than Ngap, or the time interval between the end position of the second signal and the start position of the PRACH is less than Ngap, the UE only transmits one of the signals and the transmitted signal is PRACH.

(16) if the first signal is PRACH of the SCell, the second signal is PUCCH or PUSCH, and the time interval between the end position of PRACH and the start position of the second signal is less than Ngap, or the time interval between the end position of the second signal and the start position of PRACH is less than Ngap then the UE only transmits one of the signals and the transmitted signal is the second signal.

(17) If the first signal is PRACH, the second signal is PUCCH, PUSCH or SRS, and the time interval between the end position of PRACH and the start position of the second signal is less than Ngap, or the time interval between the end position of the second signal and the start position of PRACH is less than Ngap, then the UE only transmits one of the signals and the transmitted signal is PRACH.

(18) If the first signal is the PRACH of the Pcell, the second signal is PUCCH, PUSCH or SRS, and the time interval between the end position of the PRACH and the start position of the second signal is less than Ngap, or the time interval between the end position of the second signal and the start position of the PRACH is less than Ngap, then the UE transmits these two signals according to the beam direction of the PRACH.

(19) If the first signal is PRACH of Scell, the second signal is PUCCH or PUSCH, and the time interval between the end position of PRACH and the start position of the second signal is less than Ngap, or the time interval between the end position of the second signal and the start position of PRACH is less than Ngap, then the UE transmits the these two signals according to the beam direction of the second signal.

(20) If the first signal is PRACH, the second signal is PUCCH, PUSCH or SRS, and the time interval between the end position of PRACH and the start position of the second signal is less than Ngap, or the time interval between the end position of the second signal and the start position of PRACH is less than Ngap, then the UE transmits these two signals according to the beam direction of the PRACH.

(21) If the first signal is a PUCCH bearing HARQ-ACK, SR, or a link recovery request, the second signal is SRS, and the time interval between the end position of the PUCCH and the start position of the SRS is less than Ngap, or the time interval between the end position of the SRS and the start position of the PUCCH is less than Ngap, then the UE only transmits PUCCH.

(22) If the first signal is a PUCCH bearing HARQ-ACK, SR, or a link recovery request, the second signal is an SRS, and the time interval between the end position of the PUCCH and the start position of the SRS is less than Ngap, or the time interval between the end position of the SRS and the start position of the PUCCH is less than Ngap, then the UE transmits these two signals according to the beam direction of the PUCCH.

(23) If the first signal is a PUCCH bearing periodic CSI or periodic L1-Reference Signal Received Power (RSRP)/L1-signal-to-interference and noise ratio (SINR), the second signal is aperiodic SRS, and the time interval between the end position of the PUCCH and the start position of the SRS is less than Ngap, or the time interval between the end position of the SRS and the start position of the PUCCH is less than Ngap, then the UE only transmits aperiodic SRS.

(24) If the first signal is a PUCCH bearing periodic CSI or periodic L1-RSRP/L1-SINR, the second signal is an aperiodic SRS, and the time interval between the end position of the PUCCH and the start position of the SRS is less than Ngap, or the time interval between the end position of the SRS and the start position of the PUCCH is less than Ngap, then the UE transmits these two signals according to the beam direction of the aperiodic SRS.

If the signal that cannot be transmitted is SRS, the UE may abandon transmitting SRS symbols that do not satisfy the Ngap time interval, and the UE can transmit the remaining SRS symbols. For example, the SRS resource is of 6 symbols. The first 2 symbols do not satisfy the Ngap time interval, and the UE transmits the last 4 symbols.

If the signal that cannot be transmitted is CSI-RS, the UE may abandon transmitting CSI-RS symbols that do not satisfy the Ngap time interval, and the UE can transmit the remaining CSI-RS symbols. For example, the CSI-RS resource is of 6 symbols. The first 2 symbols do not satisfy the Nag time interval, and the UE transmits the last 4 symbols.

The base station or UE, should avoid that the time interval from the end position of the first signal to the start position of the second signal is less than Ngap, or in other words, the base station or UE does not expect that the time interval from the end position of the first signal to the start position of the second signal is less than Ngap.

The above-described method may be applicable to the transmission and reception of signals based on different beams on the same carrier, or it may be applicable to the transmission and reception of signals based on different beams on different carriers in the same frequency band.

The base station may schedule multiple PDSCH or PUSCH transmissions through one DCI, and the time resources of multiple PDSCHs or PUSCHs indicated by the DCI may be continuous. If multiple adjacent PDSCHs or PUSCHs are based on different beams, then the start symbol and end symbol of these PDSCHs are determined according to the indicated time resource and Ngap, in accordance with the pre-defined rules. For example, the number of symbols L is determined according to Ngap, so that the time length of the number of symbols L is not less than the time length of Ngap. Assuming that PDSCH1 and PDSCH2 are scheduled by one DCI, the start of PDSCH1 indicated by the respective time resource information SLIV1 and SLIV2 is the symbol $L_{S1}$, the end symbol of PDSCH1 is $L_{E1}$, the start of PDSCH2 is the symbol $L_{S2}$, and the end symbol of PDSCH2 is $L_{E2}$, and PDSCH1 and PDSCH2 are based on different beams, then, the actual end symbol of PDSCH1 is $L_{E1}$-L, and the actual start of PDSCH2 is symbol $L_{S2}$, or the actual end symbol of PDSCH1 is $L_{E1}$, and the actual start of PDSCH2 is symbol $L_{S2}$-L.

The base station may schedule multiple PDSCH or PUSCH transmissions through one DCI, and the base station may indicate the beam information of each PDSCH or PUSCH. The base station configures one or more group of beam information. Each group of beam information includes one or more beam information. For example, one group of beam information includes one or more TCI information. If the number of PDSCHs or PUSCHs scheduled by the base station is N, the number of TCIs included in one group of beam information indicated by the base station is N. If $N_{tci} \geq N$, the beam information of N or PUSCH is determined according to the first N TCI among the $N_{tci}$ TCI. The base station needs to ensure that the indication $N_{tci}$ is not less than N. Or, if $N_{tci} < N$, the beam information of N PDSCH or PUSCH is determined according to the first TCI, or the beam information of the first $N_{tci}$ PDSCH or PUSCH is determined according to the indicated $N_{tci}$ beam information, and the beam information of N-$N_{tci}$ PDSCH or PUSCH is determined according to one TCI information among the $N_{tci}$ TCI, for example, determined according to the $N_{tci}$-th beam information or the first beam information.

Accordingly, the transmission and reception of signals using different beams can be better supported.

In a wireless communication system, in order to achieve the expected reception performance, it is necessary to determine an appropriate coding rate and transmission power. In some scenarios, the transmission power is limited, for example, in an unlicensed frequency band. The transmission power limitation may be the limitation of the total power of transmission, or the limitation of the power spectral density.

Before the RRC connection is established, the base station configures the initial uplink bandwidth part (BWP) for the UE, this configuration is cell-specific, that is, it is applicable to all UEs in the cell. Before the base station configures dedicated PUCCH resources for the UE, the UE determines the PUCCH resources according to the PUCCH resource set (e.g., Table 2 below) common to the cell. The PUCCH resource set is determined based on the PUCCH resource set table (Table 2). For example, the UE determines the PUCCH resource set of the cell based on the PUCCH resource set and the row index of the PUCCH resource set indicated in the system information (the row index in Table 2 indicated by pucch-ResourceCommon), including determining the PUCCH format of the PUCCH resource, the position of the first symbol (symbol index of the start symbol), the number of symbols, physical resource block (PRB) offset of the frequency domain start, and the initial cyclic shift (CS) index set. The PUCCH resource set of the cell is common to the cell. The UE determines one PUCCH resource that it can use from the PUCCH resource set of the cell through the PUCCH resource index $r_{PUCCH}$ (e.g., through the PUCCH resource index (PRI) indicated by the PDCCH or by the Msg 2 PDSCH). Herein, the PUCCH resource set and the PUCCH resource set table can be used interchangeably.

Since there are few HARQ-ACK bits that need to be transmitted (e.g., 1 bit) before the RRC connection is established, usually 1 PRB PUCCH resource is sufficient to provide a lower bit rate. For a UE at the edge of a cell, all the transmission power can be concentrated on this PRB to transmit PUCCH, so as to guarantee the performance of the PUCCH. For the UE at the center of the cell, even less power is used to transmit PUCCH of this PRB, the performance of the PUCCH can be guaranteed. Therefore, each PUCCH resource in Table 2 is of 1 PRB. The UE can determine the PRB information of its PUCCH resource according to the PUCCH resource index $r_{PUCCH}$ and the PUCCH resource set of the cell. For example, the UE determines that the PRB index of the first frequency hopping part in frequency domain of the PUCCH resource with the PUCCH index number of $r_{PUCCH}$ is $RB_{BWP}^{offset} + \lfloor r_{PUCCH}/N_{CS} \rfloor$, PRB index of the second frequency hopping part in frequency domain of the PUCCH resource is $N_{BWP}^{size} - 1 - RB_{BWP}^{offset} - \lfloor r_{PUCCH}/N_{CS} \rfloor$. Ncs is the total number of all cyclic shift CSs in the PUCCH resource set. For example, the row of index 3 in Table 2 is the PUCCH resource set of this cell; and according to the last column (column 6) and the row of index 3 in the table, 2 Ncs in total, namely {0, 6}, is determined. $RB_{BWP}^{offset}$ is the RB offset relative to the edge of the BWP; and according to the fifth column and the row of index 3 in the table, it is determined $RB_{BWP}^{offset}=0$, $N_{BWP}^{size}$ is the bandwidth of the BWP.

However, in some scenarios, the UE may not be able to use the maximum total transmission power that the UE can support on one PRB. For example, in unlicensed frequency bands in some regions, not only the maximum total transmission power is limited, but also the power spectral density (PSD) is limited. For example, PSD=23 dBm/MHz, and maximum total transmission power=40 dBm. Then, when the bandwidth of one PRB transmitted by the UE is close to the unit bandwidth of the PSI) (e.g., the subcarrier spacing SCS=120 KHz, the bandwidth of one PRB is 1.44 MHz, which has exceeded the unit bandwidth of the PSD), the transmission power of one PRB is limited by PSD, and the UE cannot transmit 40 dBm. That is, the maximum total transmission power cannot be fully used. This will cause UEs at the edge of the relative cell to be unable to guarantee the reception performance of the PUCCH on the base station side. In this scenario, the transmission power of UE can be improved by using PUCCH resources of multiple PRBs. For example, 30 PRBs can be configured to make full use of the total transmission power.

TABLE 2

PUCCH resource set before dedicated PUCCH resource configuration

| PUCCH index | PUCCH Format | The position of the first symbol | Number of symbols | PRB offset $RB_{BWP}^{offset}$ | Initial CS index set |
|---|---|---|---|---|---|
| 0 | 0 | 12 | 2 | 0 | {0, 3} |
| 1 | 0 | 12 | 9 | 0 | {0, 4, 8} |
| 2 | 0 | 12 | 9 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

Figure 6:
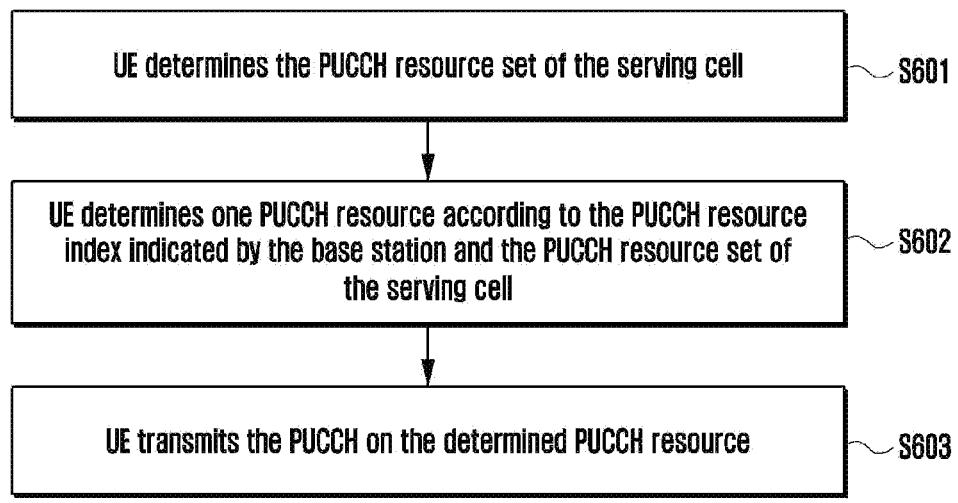
FIG. 6 is a flowchart illustrating a PUCCH transmission method, according to an embodiment.

FIG. 6 is a flowchart illustrating a PUCCH transmission method, according to an embodiment.

At S601, the UE determines the resource set of the serving cell.

At S602, the UE determines one PUCCH resource according to the PUCCH resource index indicated by the base station and the PUCCH resource set of the serving cell.

At S603, the UE transmits the PUCCH on the determined PUCCH resource.

One or more PUCCH resource sets may be pre-defined (e.g., defined by standards). The case where multiple resource sets are pre-defined and the case where one resource set is pre-defined are described below.

First, the case where multiple resource sets are pre-defined is described.

In the case where multiple PUCCH resource sets (e.g., 2 PUCCH resource sets, or 2 PUCCH resource set tables) are pre-defined (e.g., defined by standards), at S601, the UE determines the PUCCH resource set of the serving cell by determining, according to a pre-defined rule, which PUCCH resource set to use or which PUCCH resource sets to use, as the PUCCH resource set of the serving cell.

The UE determines one subset of the PUCCH resource set as the PUCCH resource set of the cell according to the indication in the system information by the base station. For example, with the row index i indicated by pucch-Resource-Common in the system information, a row with index i in the PUCCH resource set is selected as the PUCCH resource set of the serving cell. Taking Table 2 as an example, assuming that the row index indicated by pucch-ResourceCommon is i=3, the PUCCH resource set of the serving cell is shown in Table 3 below.

TABLE 3

| PUCCH index | PUCCH Format | The position of the first symbol | Number of symbols | PRB offset $RB_{BWP}^{offset}$ | Initial CS index set |
|---|---|---|---|---|---|
| 3 | 1 | 10 | 4 | 0 | {0, 6} |

From among the multiple PUCCH resource set tables, the frequency domain resource of the PUCCH resource in at least one PUCCH resource set table may be a single PRB, and the frequency domain resource of the PUCCH resource in at least one PUCCH resource set table may be multiple PRBs.

The pre-defined rules for determining the PUCCH resource set of the serving cell include one or more of the following rules:

Rule 1: The UE determines which PUCCH resource set table to use according to system information.

Rule 2: In the case that the PUCCH: resource set table is bound to the frequency point, the UE may determine the PUCCH resource set table of the corresponding serving cell according to the frequency point of the carrier of the accessing cell.

Rule 3: In the case that the PUCCH resource set table is bound to a frequency point and region, the UE may determine the PUCCH resource set table of the corresponding serving cell according to the frequency point of the carriers of the accessing cell and the located area. For example, for a frequency point at 60 GHz and a location in Europe, the UE determines to use PUCCH resource set table 4, and for a frequency point at 60 GHz and a location in China, the UE determines to use PUCCH resource set table 2.

One PUCCH resource set table may be a PUCCH resource set table supported by the serving cell by default, as shown in Table 2, and it may be determined whether another PUCCH resource set table is supported according to the method described above.

For the same cell, multiple PUCCH resource set tables can be supported. For example, the cell supports one PUCCH resource set table 2 by default, and determines whether to support another PUCCH resource set table 4 according to one of the methods described above.

All UEs in the same cell may use the same PUCCH resource set table, for example, the PUCCH resource set table of the serving cell determined based on a pre-defined rule.

Multiple UEs in the same cell have different PUCCH resource set tables. For example, for the same serving cell, if the number of PUCCH resource set tables of the serving cell determined based on a pre-defined rule is 2, then for some UEs, the PUCCH resource set table is the first PUCCH resource set table; while for some other UEs, the PUCCH resource set table is the second PUCCH resource set table. For a single UE, it is possible to determine which PUCCH resource set table to use according to a pre-defined rule, that is, determine the optimal PUCCH resource set table.

The pre-defined rules for determining the PUCCH resource set table for the UE include one or more of the following:

Rule 1: The UE determines its PUCCH resource set according to the unicast indication information from the base station. For example, the base station may indicate one PUCCH resources set through the PDCCH scheduling Msg 4, or through Msg 4 PDSCH. The indication information may be generated by physical layer information, or medium access control (MAC), or RRC information in Msg 4 PDSCH.

Rule 2: The UE determines the corresponding PUCCH resource set according to the measured DL RSRP. For example, if the measured RSRP does not exceed a pre-defined threshold, PUCCH resource set 2 is used, otherwise PUCCH resource set 1 is used.

Rule 3: UE determines the corresponding PUCCH resource set according to the number of PRBs of Msg 3 PUSCH or the number of repetitions of message 3 PUSCH. For example, if the number of PRBs of Msg 3 PUSCH exceeds a pre-defined threshold, PUCCH resource set 2 is used, otherwise PUCCH resource set 1 is used.

Rule 4: The UE determines the corresponding PUCCH resource set according to the number of PRBs of the PRACH transmitted or the resource set of PRACH, For example, if the number of PRBs of the PRACH transmitted exceeds a pre-defined threshold, PUCCH resource set 2 is used, otherwise, PUCCH resource set 1 is used.

In some scenarios, the UE may select one PUCCH resource set according to pre-defined rules. For example, according to Rule 2, DL RSRP is used to determine the PUCCH resource set, the UE needs to inform the base station which PUCCH resource set it has selected. The UE informs the base station according to at least one of the following methods:

Method 1: The UE informs the base station through PRACH. For example, the base station is informed of the PUCCH resource set selected by the UE through different PRACH resources. The correspondence between the PRACH resource group and the PUCCH resource set table may be pre-defined.

Method 2: The UE informs the base station through Msg. A PUSCH. For example, through the physical layer information (for example, physical layer uplink control information) or MAC, or RRC information bearer in the Msg A PUSCH, the base station is informed of the PUCCH resource set selected by the UE.

Method 3: The UE informs the base station through Msg 3 PUSCH. For example, through the physical layer information (e.g., physical layer uplink control information) or MAC, or RRC information bearer in the Msg 3 PUSCH, the base station is informed of the PUCCH resource set selected by the UE.

The base station may allocate PUCCH resources to the UE according to the PUCCH resource set informed by the UE.

The base station may allocate PUCCH resources to the UE regardless of the PUCCH resource set informed by the UE. The PUCCH resource set information informed by the UE is only used as a reference for the base station to determine the PUCCH resource of the UE.

Whether the UE can support PUCCH transmission of multiple PRBs may be a UE capability. The UE needs to report the UE capability to the base station, and the base station can configure an appropriate PUCCH resource set for the UE according to the UE capabilities. The UE can inform the base station through Msg A PUSCH or Msg 3 PUSCH. For example, through the physical layer information (e.g., physical layer uplink control information) or MAC, or RRC information bearer in the Msg A/Msg 3 PUSCH, the UE capability is informed.

At S602, determining the PUCCH resource according to the PUCCH resource index indicated by the base station and the PUCCH resource set of the serving cell includes determining the PUCCH resources available to the UE based on the PUCCH resource index $r_{PUCCH}$ indicated by the base station and the PUCCH resource set of the serving cell determined at S601. The PUCCH resource index $r_{PUCCH}$ may be indicated by the base station through PDCCH (e.g., PDCCH scheduling Msg 4), or Msg 4 PUSCH or Msg 2 PUSCH.

When the UE determines the PUCCH resource set of a serving cell according to S601, the UE determines the number of PRBs of one PUCCH resource. Preferably, in the case that multiple PUCCH resource sets are pre-defined (for example, defined by standards), the number of PRBs of each PUCCH resource in one PUCCH resource set is the same, and the number of PRBs of PUCCH resources in various PUCCH resource set may be different. The UE determines the PUCCH resource set of one serving cell at S601, thereby determining the number of PRBs of one PUCCH resource.

In the case that multiple PUCCH resource sets are pre-defined (for example, defined by standards), the number of PRBs of each PUCCH resource in one PUCCH resource set may be the same or different, and the number of PRBs of PUCCH resources in each PUCCH resource set may be different, and the number of PRBs of various PUCCH resources in the PUCCH resource set of one serving cell may be the same. The UE determines the PUCCH resource set of one serving cell according to S601, thereby determining the number of PRBs of one PUCCH resource.

At S603, the UE transmits the PUCCH on the determined PUCCH resource.

The case that a single resource set is pre-defined is described below.

In a case where one PUCCH resource set (e.g., Table 2) is pre-defined (e.g., defined by a standard), at S601, determining the PUCCH resource set of the serving cell by UE includes determining the PUCCH resource set of the serving cell from among the one PUCCH resource set defined by the standards.

At S302, determining the PUCCH resource according to the PUCCH resource index indicated by the base station and the PUCCH resource set of the serving cell includes determining the PUCCH resources available to the UE based on the PUCCH resource index $r_{PUCCH}$ indicated by the base station and the PUCCH resource set of the serving cell determined at S601. The PUCCH resource index $r_{PUCCH}$ may be indicated by the base station through PDCCH (e.g., PUCCH scheduling Msg 4), or Msg 4 PDSCH or Msg 2 PDSCH.

Determining the PUCCH resources available to the UE further includes determining the number of PRBs of one PUCCH resource (also referred to as the granularity of frequency domain resources) according to a pre-defined method. For example, the number of PRBs of one PUCCH resource is N1 or N2. Preferably, N1=1, N2 is an integer greater than 1, and N2 is pre-defined by the standard or configured by the base station. The pre-defined rule for determining the number of PRBs of one PUCCH resource is one or more of the following:

Rule 1: The UE determines the granularity of the frequency domain resource of the one PUCCH resource according to the system information. For example, the PUCCH resource set is Table 2, the base station indicates in the system information that the row of index 3 in Table 2 is the PUCCH resource set of this cell. And the base station indicates in the system information that the granularity of the frequency domain resources of each PUCCH resource in the PUCCH resource set of the cell is N2 PRBs, for example, N2=4.

Rule 2: In the case that the PUCCH resource set table is bound to the frequency point, the UE may determine the granularity of the frequency domain resource of the corresponding PUCCH resource according to the frequency point of the carrier of the accessing cell.

Rule 3: In the case that the PUCCH resource set table is bound to a frequency point and region, the UE may determine the granularity of the frequency domain resource of the corresponding PUCCH resource according to the frequency point of the carriers of the accessing cell and the located area. For example, for a frequency point at 60 GHz and a location in Europe, the UE determines that the granularity of the frequency domain resource of the PUCCH resource is 4 PRBs, and for a frequency point at 60 GHz and a location in China, the UE determines that the granularity of the frequency domain resource of the PUCCH resource is 1 PRB.

Rule 4: The granularity of the frequency domain resource of the PUCCH resource is determined according to the PUCCH resource index $r_{PUCCH}$. For example, pre-defined by standards or configured by base station, in the PUCCH resource set of one cell, the granularity of frequency domain resources of some PUCCH resources is N1 PRBs, and the granularity of frequency domain resources of some PUCCH resources is N2 PRBs. For example, the granularity of the frequency domain resource of the PUCCH resource with $r_{PUCCH}$>R1 is N2 PRBs, and the granularity of the frequency domain resource of the PUCCH resource with $r_{PUCCH}$≤R1 is N1 PRBs. The UE may determine the granularity of the frequency domain resources of the PUCCH resource according to the PUCCH resource index $r_{PUCCH}$.

The granularity N1 of the frequency domain resource of the PUCCH resource may be supported by the serving cell by default, and it may be determined whether another granularity N2 of the frequency domain resource of PUCCH resource is supported according to the method described above.

For the same cell, the multiple granularities of frequency domain resources of PUCCH resources can be supported. For example, the granularity N1 of the frequency domain resource of the PUCCH resource is supported by the serving cell by default, and it is determined whether another granularity N2 of the frequency domain resource of PUCCH resource is supported according to the method described above.

All UEs in the same cell may instead use the same granularity of frequency domain resources of PUCCH resource.

For multiple UEs in the same cell, it may be determined that which granularity of the frequency domain resource of PUCCH resource is used with respect to each UE, respectively. The method for determining that which granularity of the frequency domain resource of PUCCH resource is used with respect to each UE respectively includes at least one of the following methods:

Method 1. The UE determines the granularity of the frequency domain resource of the PUCCH resource according to the unicast indication information from the base station;

Method 2. The UE determines which granularity of the frequency domain resource of the PUCCH resource to use based on pre-defined rules, and informs the base station; and/or Method 3. The UE determines which granularity of the frequency domain resource of the PUCCH resource to use based on pre-defined rules. The base station may determine which granularity of the frequency domain resource of the PUCCH resource to be used by the UE based on the same rule.

In Method 1, the base station indicates one granularity of the frequency domain resource of the PUCCH resource for the UE. For example, it is indicated by the base station through the PDCCH scheduling Msg 4, or through Msg 4 PDSCH. The indication information may be generated from the PDCCH, the bit area which is an indication of the granularity of the frequency domain resource of the PUCCH resource is added to the DCI, or the bit area in the DCI is reused (e.g., the DAI bit field or the NDI bit field). The indication information may be generated from physical layer information, or MAC, or RRC information in Msg 4 PDSCH.

In Method 2, the pre-defined rule is at least one or more of the following rules:

Rule 1: The UE determines one granularity of the frequency domain resource of the PUCCH resource according to the measured DL RSRP. For example, if the measured RSRP does not exceed a pre-defined threshold, the granularity N2 of the frequency domain resource of PUCCH resource is used, otherwise the granularity N1 of the frequency domain resource of PUCCH resource is used.

Rule 2: The UE determines the granularity of the frequency domain resource of the PUCCH resource according to the number of PRBs of Msg 3 PUSCH or the UE determines the granularity of the frequency domain resource of the PUCCH resource according to the number of repetitions of message 3 PUSCH. For example, if the number of PRBs of Msg 3 PUSCH exceeds a pre-defined threshold, the granularity N2 of the frequency domain resource of PUCCH resource is used, otherwise the granularity N1 of the frequency domain resource of PUCCH resource is used.

Rule 3: The UE determines the granularity of the frequency domain resources of the PUCCH resource according to the number of PRBs of the PRACH transmitted or the resource set of PRACH, For example, if the number of PRBs of the PRACH transmitted exceeds a pre-defined threshold, the granularity N2 of the frequency domain resource of PUCCH resource is used, otherwise the granularity N1 of the frequency domain resource of PUCCH resource is used.

In some scenarios, the UE may select one granularity of the frequency domain resource of the PUCCH resource according to the above pre-defined rules, and may inform the base station which granularity of the frequency domain resource of the PUCCH resource it has selected. The UE informs the base station according to at least one of the following methods:

Method 1: The UE informs the base station through PRACH. For example, through different PRACH resources, the base station is informed of the granularity of the frequency domain resources of the PUCCH resource selected by the UE. The correspondence between the PRACH resource group and the granularity of the frequency domain resources of the PUCCH resource may be pre-defined.

Method 2: The UE informs the base station through Msg A PUSCH. For example, through the physical layer information (for example, physical layer uplink control information) or MAC, or RRC information bearer in the Msg A PUSCH, the base station is informed of the granularity of the frequency domain resources of the PUCCH resource selected by the UE.

Method 3: The UE informs the base station through Msg3 PUSCH. For example, through the physical layer information (e.g., physical layer uplink control information) or MAC, or RRC information bearer in the Msg3 PUSCH, the base station is informed of the granularity of the frequency domain resources of the PUCCH resource selected by the UE.

The information on the granularity of the frequency domain resource of the PUCCH resource informed by the UE to the base station may be one single piece of signaling, or may be common to other signaling. For example, one piece of coverage-related signaling is defined by standards, which is associated with one or more coverage-related information. The UE reports the signaling to the base station, and the base station can determine the information on the granularity of the frequency domain resource of the PUCCH resource through the signaling.

The base station may allocate PUCCH resources to the UE according to the granularity of the frequency domain resources of the PUCCH resources informed by the UE.

As a variant of Method 2, the base station may allocate PUCCH resources to the UE regardless of the granularity of the frequency domain resources of the PUCCH resources informed by the UE. The granularity of the frequency domain resources of the PUCCH resources informed by the UE is only used as a reference for the base station to determine the PUCCH resources of the UE. The base station will indicate to the UE one granularity of a frequency domain resource of a PUCCH resource. For example, it may be indicated by the base station through the PDCCH scheduling Msg 4, or through Msg 4 PDSCH.

In Method 3, the UE determines which granularity of the frequency domain resource of the PUCCH resource to use based on the pre-defined rules, and the base station may determine which granularity of the frequency domain resource of the PUCCH resource is used by the UE based on the same rules, therefore, there is no need for the UE to report the selected granularity of the frequency domain resource of the PUCCH resource, and there is no need for the base station to indicate the granularity of the frequency domain resource of the PUCCH resource neither. For example, both the UE and the base station determine the granularity of the frequency domain resource of the PUCCH resource based on the number of PRBs of the Msg 3 PUSCH, or the UE determines the granularity of the frequency domain resource of the PUCCH resource according to the number of repetitions of Msg 3 PUSCH.

If the granularity of the frequency domain resource of the PUCCH resource is N2, the UE may determine that the start point of PRB of the PUCCH resource with the PUCCH index number of $r_{PUCCH}$ $r_{PUCCH}$ is $RB_{BWP}^{offset} N2 * \lfloor r_{PUCCH}/N_{CS} \rfloor$, and $N_{BWP}^{size} - 1 - RB_{BWP}^{offset} - N2 * \lfloor r_{PUCCH}/N_{CS} \rfloor$, or the start point of PRB of the PUCCH resource is $N_{BWP}^{size} - 1 - RB_{BWP}^{offset} - N2 * \lfloor (r_{PUCCH} - X)/N_{CS} \rfloor$, and/or $RB_{BWP}^{offset} + N2 * \lfloor (r_{PUCCH} - X)/N_{CS} \rfloor$. $r_{PUCCH}$ is determined according to the PUCCH resource index (PRI) indicated in the PDCCH, and Ncs is the total number of all cyclic shift CSs in the PUCCH resource set. For example, the row of index 3 in Table 2 is the PUCCH resource set of this cell, and according to the last column (column 6) and the row of index 3 in the table, 2 Ncs in total, namely {0, 6}, is determined. $RB_{BWP}^{offset}$ is the RB offset relative to the edge of the BWP, and according to the fifth column and the row of index 3 in the table, it is determined $RB_{BWP}^{offset}=0$. $N_{BWP}^{size}$ is is the bandwidth of the BWP. X is a pre-defined positive integer, for example X=8.

According to the method described above, the granularity of the frequency domain resources of the PUCCH resource can be determined and the total number Ncs of all cyclic shift CSs in the PUCCH resource set can be determined as well. The value of Ncs and the value of the granularity of frequency domain resources satisfy a pre-defined relationship.

At S603, PUCCH is transmitted on the PUCCH resource.

Through the described method, when the PSD is limited, the UE can still make full use of the maximum transmission power to ensure the coverage of the uplink control channel. In the initial access phase, the probability of the successful random access process is improved.

Figure 7:
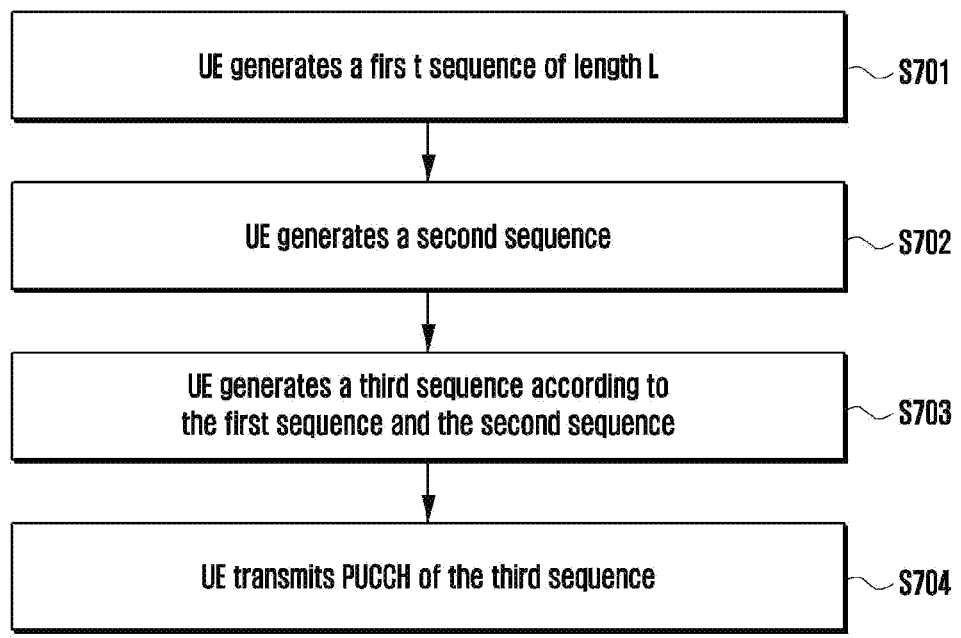
FIG. 7 is a flowchart of a PUCCH transmission method, according to an embodiment.

FIG. 7 is a flowchart illustrating a PUCCH transmission method, according to an embodiment. The PUCCH is PUCCH format 4.

At S701, a first sequence of length L is generated by the UE.

The length L is defined by the standards example, L is the number of REs that can be used for DMRS transmission in 1 PRB (e.g., L=12). The length L may instead be configured by the base station. For example, the base station configures length L=12, or configures length L=the number of PRBs of the PUCCH resource. The first sequence may be a low peak to average power ratio (PAPR) sequence, for example, the sequence $\bar{r}_{u,v}(n)$ given in 3GPP TS 38.211 5.2.2.2, as shown in Equation (1). Mzc is the sequence length (e.g., Mzc=12), u, v are the group number and the serial number in one group, respectively, and as a special case, v=0. φ(n) is given according to Table 5.2.2.2-1/2/3/4 of 3GPP TS 38.211 in this section.

$$\bar{r}_{u,v}(n) = e^{j\varphi(n)\pi/4}, \quad 0 \le n \le M_{ZC}-1 \qquad (1)$$

In another example, $\bar{r}_{u,v}(n)$ as shown in Equation (2), wherein Nzc is the largest prime number not greater than Mzc, and Mzc≥36.

$$\bar{r}_{u,v}(n) = x_q(n \bmod N_{ZC}) \quad q = \lfloor \bar{q} + 1/2 \rfloor + v \cdot (-1)^{\lfloor 2\bar{q} \rfloor} \qquad (2)$$

$$x_q(m) = e^{-j\frac{\pi q m(m+1)}{N_{ZC}}}, \qquad \bar{q} = N_{ZC} \cdot (u+1)/31$$

In another example, the low PAPR sequence is determined according to the sequence $\bar{r}_{u,v}(n)$ given in 3GPP TS 38.211 5.2.3, as shown in Equation (3).

$$\bar{r}_{u,v}(n) = \frac{1}{\sqrt{M}} \sum_{i=0}^{M-1} \bar{r}_{u,v}(i) e^{-j\frac{2\pi i n}{M}} \qquad (3)$$

$$n = 0, \ldots, M-1$$

At S702, a second sequence is generated by the UE.

The UE generates the second sequence according to the reference frequency domain resource information.

The second sequence may be $e^{j\alpha n}$, where α is a cyclic shift, and the value of α is determined according to the PRB index where the sequence is located. The index of the PRB is determined with a common resource block 0 as a reference point. Subcarrier 0 of common resource block 0 coincides with a pre-defined point A. Point A can be determined through system information. By taking common resource block 0 as the frequency domain reference point, the value of $e^{j\alpha n}$ of the second sequence can be determined so that the offsets of UEs located in the same time-frequency resource are the same, regardless of whether the start points of PRB resources occupied by the PUCCH transmitted by these UEs are aligned, and regardless of whether the numbers of PRBs occupied by the PUCCH transmitted by these UEs are the same. For example, the second sequence corresponding to the OFDM/SC-FDMA symbol 1 is expressed as e jα$_l$n, as shown in Equation (4). m0 is indicated by the base station, which can be indicated explicitly, that is, the value of m0 is indicated, or indicated implicitly, for example, the orthogonal sequence index of PUCCH is indicated and the value of m0 is indicated through the correspondence between the pre-defined orthogonal sequence index and m0. $m_{int}$ is determined according to the common PRB, for example, $m_{int} = X * n_{CRB}^\mu$, where $n_{CRB}^\mu$ is the number of common PRBs, and X is a positive integer, for example, X=5. F(1) is a function of symbol 1. The second sequence may be $e^{j\alpha n}$, where α is a cyclic shift, and the value of α is determined according to the PRB index where the sequence is located. The index of the PRB is determined with the first PRB allocated by the PUCCH as a reference point. For example, $m_{int}=X*$, wherein $n_{RB}^\mu$ is the number of PRBs in the PUCCH resource, and $n_{RB}^{\mu}=0, 1 \ldots Nprb$, Nprb is the number of PRBs of the PUCCH resource.

$$\alpha_l = \frac{2\pi}{N_{sc}^{RB}}((m_0 + m_{int} + F(l)) \bmod N_{sc}^{RB}) \quad (4)$$

The second sequence may be a spread spectrum sequence or phase rotation sequence $w_p(i)$, $i=0, 1, 2 \ldots, N_{SF}^{RS}-1$, $p=(n_0+n_{IrB}) \bmod N_{SF\_0}^{RS}$, where $n_0$ is pre-defined by the standard or configured by the base station, and $n_{IRB}$ is the number ($n_{CRB}^{\mu}$) of common PRBs, $N_{SF\_0}^{RS}$ is the sequence length of the second sequence. For the n-th spread spectrum sequence, the value of the i-th element of the spread spectrum sequence is $$w_p(i) = ej\frac{2\pi ip}{N_{SF}^{RS}}.$$

At S703, a third sequence is generated according to the first sequence and the second sequence by the UE. At S704, the PUCCH of the third sequence is transmitted by the UE.

For example, as shown in Equation (5), the third sequence is:

$$r_{u,v}(n)=r_{u,v}^{(\alpha,\delta)}(n)=e^{j\alpha n}\bar{r}_{u,v}(n), \; 0 \leq n < M_{ZC} \quad (5)$$

For example, as shown in Equation (6), the third sequence is:

$$r_{u,v}(n) = \bar{r}_{u,v}(n) w\left[\frac{n}{N_{SF}^{RS} N_{sc}^{RB}}\right]([n/N_{sc}^{RB}]) \quad (6)$$

According to Equation (5), the third sequence is generated as follows: for the first sequence of each PRB, multiplying it by a different cyclic shift (CS), and the cyclic shift (CS) corresponds to one second sequence.

According to Equation (6), the third sequence is generated as: for the first sequence of each PRB, multiplying it by a different adjustment factor, the one adjustment factor corresponding to each PRB is one element in the second sequence. The adjustment factor of each PRB varies with the PRB index.

On multiple PRBs of one PUCCH, the first sequence is the same. If only the first sequence is used, since the first sequence is repeated on multiple PRBs, the PAPR of the PUCCH is larger. In order to reduce PAPR, different rotations in frequency domain/phase/time domain can be added to different. PRBs. Therefore, the second sequence was introduced, Comparing Equation (5) with Equation (6), in Equation (5), the value of ejαn multiplied by different subcarriers n of each PRB is different; in Equation (6), the wp(i) multiplied by different subcarriers of each PRB is the same. Because the complexity of the implementation is different, the corresponding PAPR reduction effect is also different, but they are all lower than the PAPR that only uses the first sequence. In this way, not only the PAPR can be reduced, but also the multiplexing of multiple UEs can be supported. The starting points of PUCCH resource for multiple UEs that are multiplexed may be the same or different, and the number of PRBs occupied by PUCCH resources may also be different.

Orthogonal sequences in the time domain can also be introduced to support multiplexing between UEs. For example, the F(l) function in Equation (4) is defined as $$F\left(\left[\frac{l}{N_{SF}^{RS\_t}}\right]\right),$$

where $N_{SFhu\;RS\_t}$ is the length of the orthogonal sequence in the time dimension. The orthogonal sequence of the time domain can be used in combination with the method described above.

Note that the above steps may not be presented in chronological order. All steps can be implemented in one step, or the order of the steps can be exchanged, and finally the second sequence is generated.

With the above-described method, PUCCH resource multiplexing of multiple UEs can be supported, uplink transmission deficiency is improved, and PAPR is controlled to be within a reasonable range.

For PUCCH of type 1, the UE determines the number of PRBs of PUCCH to be transmitted according to the number of PRBs of PUCCH configured by the base station. For PUCCH of type 2, the UE determines the number of PRBs of PUCCH to be transmitted according to the number of PRB of PUCCH configured by the base station and the number of PRBs calculated according to a pre-defined rule. For example, assuming that the number of PRBs of PUCCH configured by the base station is X1, the number of PRBs calculated by the UE according to the payload of the UCI born by the PUCCH and the maximum bit rate is X2. For PUCCH of type 1, the number of PRBs of PUCCH transmitted by the UE is X1, and for PUCCH of type 2, the number of PRBs of PUCCH transmitted by the UE is min (X1, X2). The PUCCH of type 1 may be determined according to the PUCCH format, for example, PUCCH format 4 is PUCCH of type 1 and PUCCH of type 2 is PUCCH format 2/3. For example, PUCCH format 4 configured with UE multiplexing parameters (e.g., configure with $N_{SF}^{PUCCH,A}$, or $N_{SF}^{PUCCH,A}>1$) is a PUCCH of type 1, PUCCH format 2/3 and PUCCH format 4 without UE multiplexing parameter being configured are PUCCH of type 2. When configuring the PUCCH resource, the base station may configure which type the PUCCH belongs to. By controlling the number of PRBs of PUCCH by the base station, instead of adjusting by the UE itself, it can be ensured that the UE can make full use of the total transmission power in the case that the PSD is limited.

With the above-described method, PUCCH resource multiplexing of multiple UEs can be supported, uplink transmission efficiency is improved, and PAPR is controlled to be within a reasonable range.

Although various embodiments are described from the UE side, those skilled in the art will understand that the various embodiments of the present application also include operations on the base station side, and the base station side will perform operations corresponding to those on the UE side.

Figure 8:
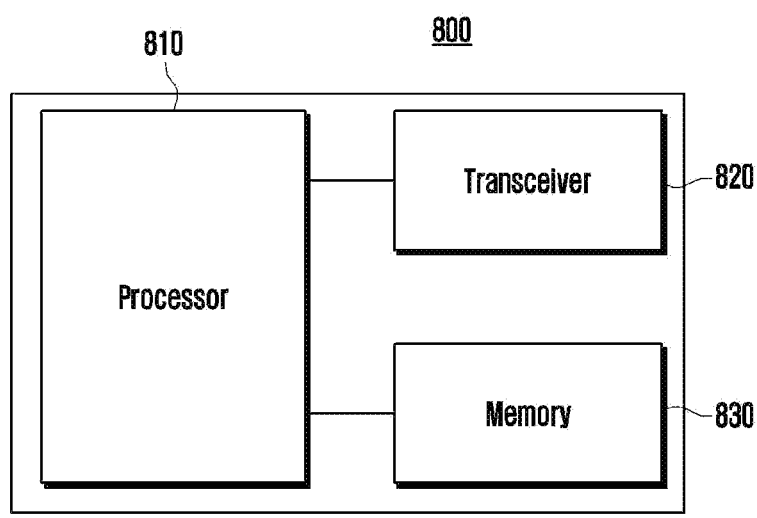
FIG. 8 is a diagram illustrating an electronic device, according to an embodiment.

FIG. 8 is a diagram illustrating an electronic device, according to an embodiment.

Referring to the FIG. 8, an electronic device 800 includes a processor (or a controller) 810, a transceiver 820, and a memory 830. However, all of the illustrated components are not essential. The electronic device 800 may be implemented by more or fewer components than those illustrated in FIG. 8. In addition, the processor 810 and the transceiver 820 and the memory 830 may be implemented as a single chip.

The electronic device 800 may correspond to the electronic device described above. For example, the electronic device 800 may correspond to the terminal or the UE 116 illustrated in FIG. 3A.

The processor 810 may include one or more processors or other processing devices that control the proposed function, process, and/or method. Operation of the electronic device 800 may be implemented by the processor 810.

The transceiver 820 may include a RF transmitter for up-converting and amplifying a transmitted signal, and a RF receiver for down-converting a frequency of a received signal. However, the transceiver 820 may also be implemented by more or fewer components than those illustrated.

The transceiver 820 may be connected to the processor 810 and transmit and/or receive a signal. The signal may include control information and data. In addition, the transceiver 820 may receive the signal through a wireless channel and output the signal to the processor 810. The transceiver 820 may transmit a signal output from the processor 810 through the wireless channel.

The memory 830 may store the control information or the data included in a signal obtained by the electronic device 800. The memory 830 may be connected to the processor 810 and store at least one instruction or a protocol or a parameter for the proposed function, process, and/or method. The memory 830 may include a ROM, a RAM, a hard disk, a compact disc (CD)-ROM, a digital versatile disc (DVD), and/or other storage devices.

Figure 9:
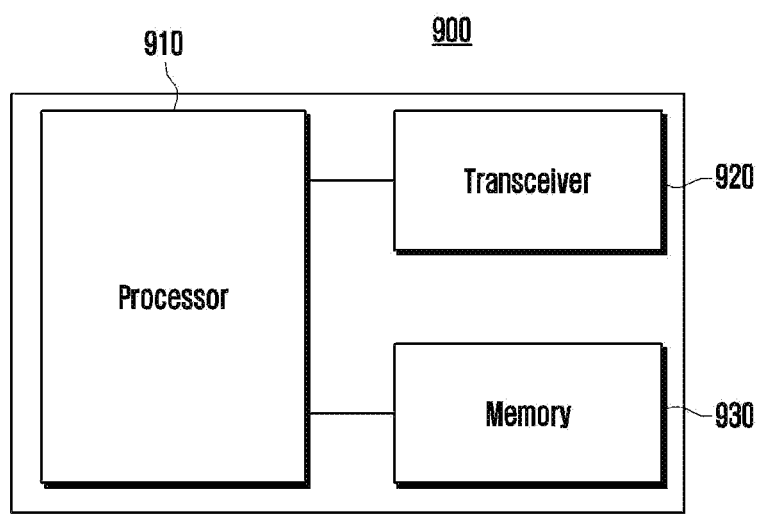
FIG. 9 is a diagram illustrating a base station, according to an embodiment.

FIG. 9 is a diagram illustrating a base station, according to an embodiment.

Referring to the FIG. 9, a base station 900 includes a processor (or a controller) 910, a transceiver 920 and a memory 930. However, all of the illustrated components may not be essential. The base station 900 may be implemented by more or fewer components than those illustrated in FIG. 9. In addition, the processor 910 and the transceiver 920 and the memory 930 may be implemented as a single chip.

The base station 900 may correspond to the gNB described above. For example, the base station 900 may correspond to the gNB 102 illustrated in FIG. 3B.

The processor 910 may include one or more processors or other processing devices that control the proposed function, process, and/or method. Operation of the base station 900 may be implemented by the processor 910.

The transceiver 920 may include an RF transmitter for up-converting and amplifying a transmitted signal, and a RF receiver for down-converting a frequency of a received signal. However, the transceiver 920 may also be implemented by more or fewer components than those illustrated.

The transceiver 920 may be connected to the processor 910 and transmit and/or receive a signal. The signal may include control information and data. In addition, the transceiver 920 may receive the signal through a wireless channel and output the signal to the processor 910. The transceiver 920 may transmit a signal output from the processor 910 through the wireless channel.

The memory 930 may store the control information or the data included in a signal obtained by the base station 900. The memory 930 may be connected to the processor 910 and store at least one instruction or a protocol or a parameter for the proposed function, process, and/or method. The memory 930 may include a ROM, a RAM, a hard disk, a CD-ROM, a DVD, and/or other storage devices.

Those skilled in the art will understand that the various illustrative logical blocks, modules, circuits, and steps described herein can be implemented as hardware, software, or a combination of hardware and software. In order to clearly illustrate the interchangeability of hardware and software, various illustrative components, blocks, modules, circuits, and steps are generally described above in the form of their function sets. Whether such function sets are implemented as hardware or software depends on the specific application and design constraints imposed on the overall system. Those skilled in the art can implement the described function set in different ways for each specific application, but such design decisions should not be construed as causing a departure from the scope of this application.

The various illustrative logic blocks, modules, and circuits described in this application may be implemented or executed by general-purpose processors, digital signal processors (DST), application-specific integrated circuits (ASIC), field programmable gate arrays (FPGA) or other programmable logic devices, discrete gate or transistor logic, discrete hardware components, or any combination designed to perform the functions described herein. A general-purpose processor may be a microprocessor, but in the alternative embodiment, the processor may be any conventional processor, controller, microcontroller, or state machine. The processor may also be implemented as a combination of computing devices, for example, a combination of a DSP and a microprocessor, multiple microprocessors, one or more microprocessors in cooperation with a DSP core, or any other such configuration.

The steps of the method or algorithm described in this application can be directly embodied in hardware, in a software module executed by a processor, or in a combination of the hardware and software module. The software module may reside in RAM memory, flash memory, ROM memory, erasable programmable ROM (EPROM) memory, electrically EPROM (EEPROM) memory, registers, hard disk, removable disk, or any other form of storage medium known in the art. An exemplary storage medium is coupled to the processor such that the processor can read information from/write information to the storage medium. In the alternative embodiment, the storage medium may be integrated into the processor. The processor and the storage medium may reside in the ASIC. The ASIC may reside in the user terminal. As an alternative, the processor and the storage medium may reside as discrete components in the user terminal.

The functions may be implemented in hardware, software, firmware, or any combination thereof. If implemented in software, each function can be stored on a computer-readable medium or transmitted over a computer-readable medium as one or more instructions or codes. Computer-readable media includes both computer storage media and communication media, the latter including any media that facilitates the transfer of a computer program from one place to another. The storage medium may be any available medium that can be accessed by a general-purpose or special-purpose computer.

Embodiments described herein are only intended for ease of description and to help comprehensive understanding of this application, and are not intended to limit the scope of this application. Therefore, it should be understood that, except for the embodiments disclosed herein, all modifications and changes or forms of modifications and changes derived from the technical idea of the present application fall within the scope of the present application.

While the disclosure has been shown and described with reference to certain embodiments thereof, it will be understood by those skilled in the art that various changes in form and detail may be made therein without departing from the scope of the disclosure. Therefore, the scope of the disclosure should not be defined as being limited to the embodiments, but should be defined by the appended claims and equivalents thereof.

What is claimed is:

1. A method performed by a terminal in a wireless communication system, the method comprising:
  receiving system information for a physical uplink control channel (PUCCH) configuration including first information associated with a PUCCH resource set;
  receiving downlink control information (DCI) for scheduling a physical downlink shared channel (PDSCH);
  receiving downlink data on the PDSCH, based on the DCI; and
  transmitting feedback information for the PDSCH on a PUCCH using a PUCCH format 0 or a PUCCH format 1, based on the PUCCH configuration,
  wherein in case that the system information includes second information indicating a number of resource blocks (RBs) used per PUCCH resource for at least one of the PUCCH format 0 or the PUCCH format 1, the number of RBs for the PUCCH is determined based on the second information, and
  wherein a lowest physical resource block (PRB) for the PUCCH is determined based on $RB_{BWP}^{offset}$ and $\lfloor r_{PUCCH}/N_{CS} \rfloor \cdot N_{RB}$, where:
    $RB_{BWP}^{offset}$ is a PRB offset associated with a bandwidth part (BWP),
    $r_{PUCCH}$ is an index associated with a PUCCH resource,
    $N_{CS}$ is a total number of initial cyclic shift indexes in a set of initial cyclic shift indexes, and
    $N_{RB}$ is the number of RBs.

2. The method of claim 1, wherein in case that the system information does not include the second information, the number of RBs for the PUCCH is determined as 1.

3. The method of claim 1, wherein the PUCCH is transmitted on a 60 GHz related frequency band.

4. The method of claim 1, wherein a set of slot offset values between the PDSCH and the PUCCH is determined according to a value of a subcarrier spacing (SCS) configuration of the PUCCH,
  wherein in case that the value of the SCS configuration of the PUCCH is less than 4, the set of slot offset values includes {1, 2, 3, 4, 5, 6, 7, 8}, and
  wherein in case that the value of the SCS configuration of the PUCCH is equal to or larger than 4, the set of slot offset values includes {7, 8}.

5. A method performed by a base station in a wireless communication system, the method comprising:
  transmitting system information for a physical uplink control channel (PUCCH) configuration including first information associated with a PUCCH resource set;
  transmitting downlink control information (DCI) for scheduling a physical downlink shared channel (PDSCH);
  transmitting downlink data on the PDSCH, according to the DCI; and
  receiving feedback information for the PDSCH on a PUCCH using a PUCCH format 0 or a PUCCH format 1, according to the PUCCH configuration,
  wherein in case that the system information includes second information indicating a number of resource blocks (RBs) used per PUCCH resource for at least one of the PUCCH format 0 or the PUCCH format 1, the PUCCH is received based on the number of RBs indicated by the second information, and
  wherein a lowest physical resource block (PRB) for the PUCCH is determined based on $RB_{BWP}^{offset}$ and $\lfloor r_{PUCCH}/N_{CS} \rfloor \cdot N_{RB}$, where:
    $RB_{BWP}^{offset}$ is a PRB offset associated with a bandwidth part (BWP),
    $r_{PUCCH}$ is an index associated with a PUCCH resource,
    $N_{CS}$ is a total number of initial cyclic shift indexes in a set of initial cyclic shift indexes, and
    $N_{RB}$ is the number of RBs.

6. The method of claim 5, wherein in case that the system information does not include the second information, the number of RBs for the PUCCH is 1.

7. The method of claim 5, wherein the PUCCH is received on a 60 GHz related frequency band.

8. The method of claim 5, wherein a set of slot offset values between the PDSCH and the PUCCH is associated with a value of a subcarrier spacing (SCS) configuration of the PUCCH,
  wherein in case that the value of the SCS configuration of the PUCCH is less than 4, the set of slot offset values includes {1, 2, 3, 4, 5, 6, 7, 8}, and
  wherein in case that the value of the SCS configuration of the PUCCH is equal to or larger than 4, the set of slot offset values includes {7, 8}.

9. A terminal in a wireless communication system, the terminal comprising:
  a transceiver; and
  a controller configured to:
    receive, via the transceiver, system information for a physical uplink control channel (PUCCH) configuration including first information associated with a PUCCH resource set,
    receive, via the transceiver, downlink control information (DCI) for scheduling a physical downlink shared channel (PDSCH),
    receive, via the transceiver, downlink data on the PDSCH, based on the DCI, and
    transmit, via the transceiver, feedback information for the PDSCH on a PUCCH using a PUCCH format 0 or a PUCCH format 1, based on the PUCCH configuration,
  wherein in case that the system information includes second information indicating a number of resource blocks (RBs) used per PUCCH resource for at least one of the PUCCH format 0 or the PUCCH format 1, the number of RBs for the PUCCH is determined based on the second information, and
  wherein a lowest physical resource block (PRB) for the PUCCH is determined based on $RB_{BWP}^{offset}$ and $\lfloor r_{PUCCH}/N_{CS} \rfloor \cdot N_{RB}$, where:
    $RP_{BWP}^{offset}$ is a PRB offset associated with a bandwidth part (BWP),
    $r_{PUCCH}$ is an index associated with a PUCCH resource,
    $N_{CS}$ is a total number of initial cyclic shift indexes in a set of initial cyclic shift indexes, and
    $N_{RB}$ is the number of RBs.

10. The terminal of claim 9, wherein in case that the system information does not include the second information, the number of RBs for the PUCCH is determined as 1.

11. The terminal of claim 9, wherein the PUCCH is transmitted on a 60 GHz related frequency band.

12. The terminal of claim 9, wherein a set of slot offset values between the PDSCH and the PUCCH is determined according to a value of a subcarrier spacing (SCS) configuration of the PUCCH, wherein in case that the value of the SCS configuration of the PUCCH is less than 4, the set of slot offset values includes {1, 2, 3, 4, 5, 6, 7, 8}, and wherein in case that the value of the SCS configuration of the PUCCH is equal to or larger than 4, the set of slot offset values includes {7, 8}.

13. A base station in a wireless communication system, the base station comprising:
  a transceiver; and
  a controller configured to:
    transmit, via the transceiver, system information for a physical uplink control channel (PUCCH) configuration including first information associated with a PUCCH resource set,
    transmit, via the transceiver, downlink control information (DCI) for scheduling a physical downlink shared channel (PDSCH),
    transmit, via the transceiver, downlink data on the PDSCH, according to the DCI, and
    receive, via the transceiver, feedback information for the PDSCH on a PUCCH using a PUCCH format 0 or a PUCCH format 1, according to the PUCCH configuration,
  wherein in case that the system information includes second information indicating a number of resource blocks (RBs) used per PUCCH resource for at least one of the PUCCH format 0 or the PUCCH format 1, the PUCCH is received based on the number of RBs indicated by the second information, and
  wherein a lowest physical resource block (PRB) for the PUCCH is determined based $RB_{BWP}^{offset}$ and $\lfloor r_{PUCCH}/N_{CS} \rfloor \cdot N_{RB}$, where:
    $RB_{BWP}^{offset}$ is a PRB offset associated with a bandwidth part (BWP),
    $r_{PUCCH}$ is an index associated with a PUCCH resource,
    $N_{CS}$ is a total number of initial cyclic shift indexes in a set of initial cyclic shift indexes, and
    $N_{RB}$ is the number of RBs.

14. The base station of claim 13, wherein in case that the system information does not include the second information, the number of RBs for the PUCCH is 1.

15. The base station of claim 13, wherein the PUCCH is received on a 60 GHz related frequency band.

16. The base station of claim 13, wherein a set of slot offset values between the PDSCH and the PUCCH is associated with to a value of a subcarrier spacing (SCS) configuration of the PUCCH,
  wherein in case that the value of the SCS configuration of the PUCCH is less than 4, the set of slot offset values includes {1, 2, 3, 4, 5, 6, 7, 8}, and
  wherein in case that the value of the SCS configuration of the PUCCH is equal to or larger than 4, the set of slot offset values includes {7, 8}.

* * * * *